US012273934B2

(12) United States Patent
Iliffe-Moon et al.

(10) Patent No.: US 12,273,934 B2
(45) Date of Patent: Apr. 8, 2025

(54) APPARATUS, METHOD, AND COMPUTER-READABLE MEDIUM FOR MANAGING A QUEUE OF MEDIA RESOURCES RECEIVED FROM MOBILE DEVICES

(71) Applicant: Bayerische Motoren Werke Aktiengesellschaft, Munich (DE)

(72) Inventors: Etienne Iliffe-Moon, Menlo Park, CA (US); Justin Forsyth, Simpsonville, SC (US); Iris Koser, San Carlos, CA (US); Lam Nguyen, Round Rock, TX (US); Walter Bronzi, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 432 days.

(21) Appl. No.: 17/817,378

(22) Filed: Aug. 4, 2022

(65) Prior Publication Data

US 2024/0049309 A1 Feb. 8, 2024

(51) Int. Cl.
*H04W 76/10* (2018.01)
*H04L 67/146* (2022.01)

(52) U.S. Cl.
CPC ........... *H04W 76/10* (2018.02); *H04L 67/146* (2013.01)

(58) Field of Classification Search
None
See application file for complete search history.

(56) References Cited

U.S. PATENT DOCUMENTS

| | | | | |
|---|---|---|---|---|
| 10,827,028 | B1 * | 11/2020 | Bromand | H04L 67/303 |
| 2014/0075308 | A1 | 3/2014 | Sanders et al. | |
| 2014/0215071 | A1 | 7/2014 | Lee et al. | |
| 2015/0201023 | A1 | 7/2015 | Kotab | |
| 2016/0144826 | A1 | 5/2016 | Nelson et al. | |
| 2017/0104824 | A1 * | 4/2017 | Bajwa | H04W 4/80 |
| 2019/0215882 | A1 | 7/2019 | Kim | |
| 2019/0332347 | A1 * | 10/2019 | Cedborg | G06F 3/165 |
| 2019/0342600 | A1 * | 11/2019 | Bromand | H04N 21/4221 |
| 2021/0392402 | A1 | 12/2021 | Patricks | |
| 2022/0070947 | A1 * | 3/2022 | Lu | G06F 3/162 |
| 2022/0104015 | A1 * | 3/2022 | McDevitt | H04N 21/43637 |
| 2023/0112398 | A1 * | 4/2023 | Fitzpatrick, III | H04B 17/327 370/329 |

* cited by examiner

*Primary Examiner* — Anh Vu H Ly
(74) *Attorney, Agent, or Firm* — Kieran O'Leary; 2SPL Patent Attorneys PartG mbB

(57) ABSTRACT

Embodiments generally relate to a system for managing media resources from a plurality of mobile devices and delivered by a vehicle. In particular, embodiments relate to an apparatus for providing a queue of media resources from a mobile device to a vehicle. The apparatus comprises a wireless transceiver, a vehicle interface, and a processor. The processor establishes a wireless connection to the mobile device and then receives a uniform resource identifier (URI) for a media resource from the mobile device. It then processes the URI to determine information on the media resource, including its media type and selects a media source associated with the media type that comprises the media resource. The processor next adds the media resource to the queue of media resources, which is broadcast via the wireless connection, and triggers the media source to provide the media resource to the vehicle via the vehicle interface.

19 Claims, 10 Drawing Sheets

FRONT OR REAR DIGITAL PROJECTION

EG. REAR SEAT DOOR PODS

APPARATUS, METHOD, AND COMPUTER-READABLE MEDIUM FOR MANAGING A QUEUE OF MEDIA RESOURCES RECEIVED FROM MOBILE DEVICES

FIELD

The present disclosure generally relates to a system for managing media resources selected by a plurality of mobile devices and delivered by a vehicle. In particular, it relates to a vehicle apparatus that receives and manages a queue of media resources received from one or more mobile devices.

BACKGROUND

Increasingly, vehicles are equipped with a number of ways to connect to a smartphone or another device. Typically, such devices are connected directly to the original equipment manufacturer's (OEM's) system—commonly through Bluetooth, WiFi, or physical data connections like a universal serial bus (USB). More recently, smartphones can use third-party (3rd party) software systems (e.g. Apple, Inc.'s CarPlay® or Google, LLC's Android Auto™) in a "projection mode" whereby an aspect of the native mobile device operating system is projected or displayed via the data connection on one or more vehicle displays. However, this typically requires the device to be "paired" and "connected." Pairing is typically a one-time operation to authorize the data connection, which is remembered by the system. Connecting is typically automatic; however, it is dependent on many factors, which may include technical conditions, available paired devices within range, device usage (e.g. an active phone call), and technical issues or errors.

A key issue in the pairing and connecting or reconnecting of a smartphone is the user workload required to successfully complete the process. The workflow is a multi-step interaction requiring knowledge, decision-making, and user input on both the smartphone and vehicle. Thus, it takes time and effort even if the process goes smoothly. The workflow typically requires a confident or tech-savvy user to figure out the process, and often some level of tech expertise or experience to resolve any pairing or connection errors or issues. Given that anyone can use and interact with a vehicle—not only owners or drivers but individuals of all ages, ranging from children to older or elderly adults—and that everyone will have different abilities and vehicle or tech experience, not all users will be inclined to pair or connect their smart device.

Hence, there may be demands for:

Quickly and temporarily sharing digital content without pairing and connecting a smartphone with a vehicle.

Improving the ease of use by leveraging similar graphical user interface (GUI) interactions from our smartphone that users are familiar with and conditioned to.

Facilitating new social experiences by conveniently sharing media with friends and family in a vehicle.

These demands may be satisfied by the subject matter of the appended independent and dependent claims.

SUMMARY

Embodiments in the present disclosure relate to an apparatus for managing a queue of media resources selected by a mobile device to be delivered by a vehicle. According to an embodiment, the apparatus comprises a wireless transceiver, a vehicle interface, and a processor. The processor is configured to establish a wireless connection to the mobile device using the wireless transceiver. Once established the processor may receive a uniform resource identifier (URI) for a media resource from the mobile device via the wireless connection and process the URI to determine information on the media resource that comprises a media type. The processor is then configured to select a media source associated with the media type that comprises the media resource. The selection of the media resource is based on the information on the media resource. The processor then adds the media resource to the queue of media resources and broadcasts information on the queue via the wireless connection. When the arrangement of the queue dictates, the processor then triggers trigger the media source to provide the media resource to the vehicle via the vehicle interface. In an embodiment, the mobile device is one of a plurality of mobile devices and the processor is configured to manage the queue of media resources selected by the plurality of mobile devices.

Generally, a primary user, such as a driver, has a device that is paired and connected to a vehicle. However, a fundamental issue with the current state of vehicle infotainment systems (irrespective of whether the device is connected by Bluetooth, a projected mode, or some other connection) is that the systems assume that any device connectivity is only for the driver (i.e. the user is the driver). Yet there are often more users in the vehicle that would like to interact with the vehicle's systems, particularly those that may not require as extensive connectivity as the driver or other primary users. For example, rear seat passengers typically have no access to the central instrument display (CID) for wirelessly connecting their smart devices, yet they often would like to share locations or music. Embodiments in the present disclosure take a broader viewpoint that any person inside the vehicle (i.e. the passengers) should be able to take advantage of the infotainment system and share media resources seamlessly, with zero friction.

A media resource is any digital content that can be shared from a smartphone to a vehicle, particularly content that can be delivered by the vehicle's infotainment system. This primarily consists of music, movies, pictures, and social media delivered by native or 3rd party apps. Often these apps comprise (but are not limited to) streaming services. However, a media resource may include many other sources and types of content, such as navigation (e.g. interest, destination, websites, etc.), communication (e.g. the native phone app, text messages, email, etc.), and information (e.g. app-specific, website based, etc.). Further, sharing digital content and media resources may include, technologies related to AR/VR, "metaverse," NFT, "Web3" (or Web 3.0), etc. Essentially, media resources can be any content from any app that may have a sharing feature.

Typically, smartphone operating systems have native and 3rd party apps (e.g. via text message, social media, email, specific app, etc.) with "Share . . . " buttons in the GUI that are intended to share content with another person (e.g. using a personal identifier such as phone number, email address, username, cloud/app profile, etc.). These sharing options are often provided by the operating system when an app registers itself as an option with the operating system through a sharing application programming interface (API). Commonly, when an app registers itself with the operating system, it implements a "peer-to-peer" sharing solution between users' personal devices. In other words, it allows a user to share digital content directly with another user. Another commonly implemented solution allows a user to share digital content to a profile owned by that user, such as creating a post or story for various social media pages. Sharing is rarely, if ever, intended to be done directly to a system or environment shared between multiple users and has never been implemented to share to a vehicle. Additionally, prior solutions have technical constraints that prevent the management of media content that is shared (e.g. features/functions relative to a media queue or manager, such as play, pause, skip, repeat/replay, cancel, reordering queue, sequence, etc.). For example, some systems that share with another device behave in a way that "mirrors" the device screen (known as device mirroring, i.e. video content is streamed from the device) or "casts" content (i.e. video content is streamed from a source that is not the device). This may be dependent on the content being shared (e.g. YouTube video or Netflix movie vs. a camera video or photo) or dependent on Digital Rights Management (DRM, e.g. HDCP) requirements. These systems deliver the media resources in real-time (i.e. live) and cannot be queued and viewed at a later time. The embodiments shared herein thus provide a combined technical solution and user interaction solution that enables digital media sharing to be delivered to the cabin of a vehicle and managed across multiple GUI output formats (e.g. displays/touchscreens, HUD, AR HUD, panorama HUD, digital projection, AR/VR/MR headset, etc.).

Commonly, if a passenger (e.g. in the front or rear seat) were to share music in the vehicle it would require the passenger to access or takeover the CID GUI from the driver and most likely require the disconnection of the driver's smartphone. This would be a significant distraction and annoyance to the driver and a safety risk. Furthermore, this would result in the disengagement or disconnection of any apps such as navigation, communication, and entertainment, which may add to the distraction. Additionally, in many cases, the rear seat passengers would likely not have direct access to the CID or infotainment system—particularly if there is only one display—to connect their smartphone without the help of a front seat passenger or driver. In certain scenarios, such as in a taxi or car service, a driver operating a CID on behalf of a rear-seat passenger may decrease the driver's level of attention. A passenger in this scenario who has access to the infotainment system on their mobile device may reduce a driver's distraction.

There are many situations where a user can have issues with pairing and connecting smartphones—irrespective of the connection mode—due to technical issues or user error. Establishing and maintaining a connection is dependent both on the device and the vehicle systems. Often it is not clear what the issue is, and frequent software updates can be attributed to the issue. Solving these problems may require users to dig deep into the settings menu of both the vehicle and device to attempt to understand the issue and resolve it, generally by trial and error. This complexity and lack of a transparent and user-friendly connectivity interface are often a reason users prefer not to connect to the vehicle at all or prefer one method over another (e.g. Bluetooth rather than a projected mode). The wireless transceiver may be any radio frequency (RF) means of connecting to an apparatus including Bluetooth and WiFi. In some embodiments, it may be a Bluetooth Low Energy (BLE) transceiver or beacon. BLE enables proximate devices to connect to an apparatus without previously being paired and with significant energy advantages over traditional Bluetooth.

The workload of pairing and connecting a smartphone, along with this friction (e.g. lack of ease of use, the potential for errors, etc.) makes it highly unlikely that a passenger would attempt to connect their smartphone for a short period of time, or, for example, just to share a music song (e.g. via Spotify®, Apple Music®, etc.) or a movie (e.g. via TikTok®, YouTube®, Netflix®, etc.), or when there's a sense of urgency (e.g. providing quick navigation directions whilst driving or adding a pit stop to a preplanned route). The effort far outweighs the benefit, and what would have been a spontaneous or timely moment would have quickly passed by the time the smartphone was connected (assuming it connected smoothly on the first try).

Projected modes enable a certain level of integration of smartphones, within specific constraints that are a result of decisions made by the 3rd party software maker and resulting technical constraints that occur (e.g. related to the device and/or vehicle software and hardware stack, communication protocols, etc.). From a consumer perspective, these projected modes offer a sense of digital life integration and convenience, within the "constraints" outlined above and below. Projected modes typically work well if the user is the driver, they have taken the time to pair the device, and automatic connection has been successful, and the user's smartphone is a current or recent version hardware and/or software release. However, if the user is a passenger, and working outside these constraints, the experience is problematic. Thus, the embodiments in this disclosure provide a vastly improved user and social experience by removing the constraints to pairing multiple devices with a vehicle.

However, another issue with current systems is the limit to the number of devices that can be connected at any one time. Bluetooth is typically limited to two to four devices. Projected modes are often limited to one device. Moreover, there are typically limits to the number of devices that can be paired (but not connected) at any one time. Typically, a driver's smartphone will be connected to the vehicle (e.g. by choice or automatically), which inhibits passengers from pairing and/or connecting to the vehicle or infotainment system. If a passenger were to connect to the vehicle, it would typically disconnect the driver's device and any active apps (e.g. navigation, phone calls, music, etc.) and disrupt the driver's experience. Even if this interruption was wanted by the driver, switching between devices is not entirely seamless or easy. The embodiments herein are not limited to so few devices as they are not streaming content from the device but sending URIs to the vehicle which then retrieves the content. Moreover, the described embodiments do not interrupt a driver's connection to the vehicle, which may be necessary to maintain for information or safety purposes.

Embodiments are based on the finding that CIDs can be integrated across the cabin or interior space of a vehicle. This enables digital media sharing to be delivered to the cabin across multiple GUI output formats (e.g. displays/touchscreens, instrument clusters, heads-up displays (HUD), augmented reality (AR) HUD, panorama HUD, digital projection, or as an AR, virtual reality (VR), or mixed-reality (MR) headset, etc.).

A vehicle may be land-, sea-, or air-based. It may include any apparatus used for transportation. Additionally, the method, system, and computer program are vehicle independent and may be deployed in environments and systems not used or designed for transportation, such as in a home, a retail environment, public spaces, or an office. In an embodiment, the apparatus for managing a queue of media resources received from a mobile device to be delivered by a vehicle is implemented as a daemon app on the vehicle's infotainment system, head unit, or another operating system. In multitasking computer operating systems, a daemon is a computer program that runs as a background process, rather than being under the direct control of an interactive user.

A touchscreen may be a digital display with capacitive or similar touch properties. A display may be an electroluminescent (ELD), liquid crystal (LCD), light-emitting diode (LED), thin-film transistor, organic LED (OLED), active-matrix OLED (AMOLED) plasma (PDP), quantum dot (QLED), cathode ray tube, or segment displays. The display may have additional properties such as presence detection, acoustic, or infrared touchscreen properties.

The present disclosure may allow any user (e.g. not only a primary user) to seamlessly share media content in the vehicle without affecting the primary user's connection to the vehicle. A primary may be a driver, a most frequent driver, or a user that unlocked the vehicle (e.g. with a key fob or smartphone, manually or automatically) whose smartphone is paired and connected to the vehicle. It may be possible to have a plurality (2 or more) of primary users, dependent on the details of the vehicle systems and other aspects (e.g. communication protocols, etc.).

The method of sharing media resources involves a URI. A URI is a unique sequence of characters that identifies a logical or physical resource used by web technologies. URIs may be used to identify anything, including real-world objects, such as people and places, concepts, or information resources such as web pages and books. Some URIs provide a means of locating and retrieving information resources on a network (either on the Internet or on another private network, such as a computer filesystem or an Intranet); these are Uniform Resource Locators (URLs). A URL provides the location of the resource. A URI identifies the resource by name at the specified location or URL. Other URIs provide only a unique name, without a means of locating or retrieving the resource or information about it, these are Uniform Resource Names (URNs). The web technologies that use URIs are not limited to web browsers. URIs are used to identify anything described using the Resource Description Framework (RDF), for example, concepts that are part of an ontology defined using the Web Ontology Language (OWL), and people who are described using the Friend of a Friend vocabulary would each have an individual URI. As the actual media resource (e.g. song, video, navigation sequence) is not shared directly with the vehicle, the URI facilitates the transfer of information between the mobile device, apparatus, media sources, or apps and the vehicle.

Media sources may be software or apps (e.g. OEM or 3rd party) preinstalled or installed at any time on the vehicle. The software or apps would enable shared media resources or content to be played. Additionally, the user profile of the primary user(s) (or potentially any user) and/or vehicle profile would allow access rights to the media (e.g. according to app/service/subscription agreements), as is common with free and paid digital streaming media services (e.g. Spotify, Apple Music, Netflix, YouTube, etc.) and resolve any Digital Rights Management (DRM) issues.

According to another embodiment, the apparatus is configured to provide discovery or connection information to the mobile device wherein the connection information comprises a connection identifier uniquely relating to the vehicle and the wireless connection is known by the connection identifier. Providing a unique connection identifier, such as a car's vehicle identification number (VIN), allows the connecting wireless devices to identify the vehicle to which they are connecting. This prevents a user from sharing media to another vehicle with which they have previously connected, or which is also in the vicinity of the vehicle in which they are riding. The unique identifier may be identified by means other than the VIN such as a production number.

The process of discovering the correct device and vehicle in vehicles can lack clarity and be ambiguous (i.e. it is not user-friendly and easy to use). For example, when a device or vehicle is visible via Bluetooth (e.g. on the smartphone and/or vehicle) the naming convention may be arbitrary and not descriptive, such that it does not help to identify the vehicle or the devices confidently and accurately. Additionally, if there are multiple smartphones in the vicinity of the exterior and/or interior of the vehicle, there may be situations where a specific phone is connected first (if previously paired) according to some default or set conditions (e.g. the phone that reaches the car first, a phone that is on an active call, etc.). It is often not clear to the occupants of the vehicle whose device is connected, which is confusing. A comparable situation exists when multiple vehicles are involved (e.g. house driveway, 2-3 unlocked vehicles, or one or more active smartphones are paired to multiple vehicles, etc.). By providing connection information to the user's device the user does not have to identify which wireless connection they must connect to, simplifying and speeding up the connection process.

The connection information may be provided via the wireless connection, a machine-readable optical label, or a near-field communication (NFC) connection. Providing the connection information directly to the user allows them to discover and install the correct app on their smart devices quickly and easily. Moreover, using physically accessible barcodes, NFC tags, or other location-based means ensures that only users present in the vehicle are provided with the connection information. This ensures that the connection is private and that other users within range of the vehicle are not bothered by connection prompts.

Additionally, it is often not evident to a passenger—and sometimes even the driver or person whose device is connected—what device connectivity mode is active (e.g. if and how the driver's smartphone is connected to the vehicle, such as a projected mode versus the OEM or native infotainment mode). Some systems require the passenger to be aware of (by some means, e.g. talking to the driver) the connection method and how to pair and connect their device to the vehicle, which is impractical. Thus, directly providing the user with connection information provides a solution to this problem and additionally provides a user interaction solution to moderating and managing the sharing of digital content from multiple smartphones and other smart devices.

Data on a machine-readable optical label or barcode may include a link to a downloadable application or key to activation of software that can communicate with the head unit. Optional data may include cryptographic material to ensure secure communication with the specific head unit offering the discovery code. Barcodes must be captured by an optical sensor on a mobile device. The barcode can be shown on one of the vehicle's displays. Alternatively, the barcode could be a permanent fixture of the vehicle interior (printed on a surface, pressed into leather, etc.).

A machine-readable optical label or barcode may be of a standard format such as a linear barcode or matrix barcode (e.g. QR code, App Clip Code, etc.). Alternatively, the machine-readable optical label may consist of a highly customized graphic or motion graphic (e.g. 2D, 3D, etc.; e.g. animation, video, computer-generated (CG) visual effect, procedurally generated CG effect, etc.) that is physically, digitally, or virtually presented on the exterior or interior of the vehicle or an accessory of the vehicle (e.g. key fob, key card, smartphone case, etc.). Physical presentation of a label may be done on any surface or material of a vehicle. It may be presented in 2D or 3D and may be embossed leather, embroidered fabric, printed on glass, engraved on metal, 3D printed, etc. The digital presentation may include the presentation of the label on a display, touchscreen, HUD, digital projection, and Panorama HUD. These displays or touchscreens may comprise LCD, OLED, Micro LED, and E-paper. The virtual presentation may include the presentation of the label in AR, VR, or MR and may be presented in either 2D or 3D in these virtual formats.

NFC data may include a link to a downloadable application or key to the activation of software that can communicate with the head unit. Optional data may include cryptographic material to ensure secure communication with the specific head unit offering the discovery tag. The tag must be scanned by a near-field scanner on a mobile device. Tags can be permanent physical fixtures of the vehicle interior.

In one embodiment, the connection may be provided using data broadcast over RF such as Bluetooth, BLE, or WiFi. An RF broadcast may notify a mobile device user on methods to connect to the vehicle. It may also provide unique connection information for an application already present on a user's mobile device to establish a connection to the vehicle. For example, the already present application could be an application previously downloaded as part of a connection to another vehicle. It also could be an application provided as a general or multi-purpose application by the OEM of the vehicle with greater functionality beyond the sharing of media resources.

In one embodiment, the connection information further comprises an application identifier of an application for communicating with the apparatus via the wireless connection. The discovery methods (e.g. QR code, NFC tag, and BLE beacon) are an effective solution to quickly and easily guide the user to find and install the correct app on their smart devices. Once the app is installed, the app can identify the vehicle and all subsequent journeys are facilitated. Additionally, it may be possible for journeys in other vehicles to be facilitated without having to repeat the discovery process for each new vehicle.

The broadcast of discovery or connection information may link to a downloadable application or key to the activation of software that can communicate with the head unit. The link may lead the user to an application store associated with their smartphone to download the application. In some embodiments, the link may directly cause the connection application to download. The link may optionally include information embedded in it, such as an encrypted hash of the VIN, which the connection application would use to connect to the vehicle. The connection information may optionally include cryptographic material to ensure secure communication with the specific head unit offering the discovery RF broadcast. Mobile devices determined to be inside the vehicle via RF proximity pairing technology (e.g. BLE transceivers or beacons) could be automatically prompted to download or activate appropriate software to communicate with the head unit.

In an embodiment, the processor is configured to receive metadata for the media resource from the media source, wherein the metadata is broadcast over the wireless connection. The broadcasting of metadata over the wireless connection may allow all users to see the current media resource that is in the queue as well as associated data for it without looking that the CID or other displays of the vehicle.

The queue of media resources may be associated with the media type. Different media resources may be placed in different queues. For example, a queue of videos may be played on screens in the second row of the vehicle so as not to distract the driver. Whereas a queue of locations could be presented to the driver via the CID in a navigation GUI.

In another embodiment, the processor may be configured to receive adjusted queue information from the mobile device via the wireless connection and adjust the queue based on the adjusted queue information. Adjusting the queue at the mobile devices allows for users without physical access to the infotainment system or knowledge of its features to adjust the queue without interacting with it.

Optionally or alternatively, digital content may be streamed with real-time control, and the user experience or GUI display of the content may adapt accordingly to show the content being streamed in real-time. This feature may allow the sharing user (or potentially any user) to control the media (e.g. play, pause, scrub backward/forward, zoom, etc.) as an aspect of the experience. The benefit would allow for the control of content in real-time.

In another embodiment, the vehicle conveys the media resource to a user. The vehicle can provide the resource to the user or users in the cabin of the vehicle. An appropriate media app serves the media content, either on one of the automobile's displays, over the automobile's loudspeakers, or both. The media content can be retrieved from various sources (internet, local storage, radio, etc.). During playback, playback state information and media metadata are sent from the media app back to the daemon app for visualization and queue-maintenance purposes.

In another embodiment, a mobile device may send playback state information to the apparatus of the vehicle via the wireless connection. This allows the user of the mobile device to perform actions such as play, pause, repeat (once or a plurality of times), advance, or go back to a previous media resource of a queue. The apparatus of the vehicle may broadcast via the wireless connection, playback state information on the media resource of the queue of media resources that are provided to the vehicle. The mobile device may receive playback state information on a media resource of the queue of media resources currently provided to the vehicle. The playback state information may be displayed to the user as a timeline of the media resource (e.g. minutes left on a video or audio resource), and the playback information may be adjustable by the user of the mobile device (e.g. by scrubbing or jumping to a specific timestamp in a movie or song). That adjusted playback information can then be sent to the apparatus. The apparatus then receives the adjusted playback state information from the mobile device via the wireless connection and alters or adjusts the provision of the media resource to the vehicle based on the adjusted playback state information.

Embodiments in the present disclosure also relate to a mobile device for interacting with a queue of media resources provided to a vehicle. According to one embodiment, the mobile device comprises a wireless transceiver, a media source interface, and a processor. The processor is configured to establish a wireless connection to an apparatus connected with the vehicle using the wireless transceiver, wherein the wireless connection is known by a connection identifier relating to the vehicle. The processer then is configured to receive a URI for a media resource via the media source interface and provide the URI to the apparatus via the wireless connection, wherein the apparatus determines the media resource from the URI and adds the media resource to the queue of media resources. The processor is configured to receive information on the queue of media resources broadcast from the apparatus and display the information on the queue of media resources to a user of the mobile device. The discovery methods are an effective solution to quickly and easily guide the user to find and install the correct app on their smart devices.

Once the app is installed, the app can identify the vehicle and all subsequent journeys are facilitated. Additionally, it may be possible for journeys in other vehicles to be facilitated without having to repeat the discovery process for each new vehicle. After discovery, mobile devices can share media URIs wirelessly with the head unit. One or more users may manage or control the shared content that appears in the queue by one or more interaction devices (e.g. front CID, rear seat display(s), digital projection, smartphone, or smart-device app, etc.). For example, single or multi-touch interactions/gestures such as click and swipe may be used to play/pause, skip, or reorder content by dragging/dropping media resources or digital content (e.g. song, movie clip, photo, playlist, etc.) from one position to another in the queue, removing content from the queue by dragging content off the queue, playing content by dragging the content into the "now playing" panel/field, etc. There may be multiple interaction modalities to achieve the same use-interaction input, for example clicking, dragging, swiping, long-press context or sub-menu, or an "options" icon or menu to open additional/relative GUI panels. In addition to touch sensing (e.g. multi-touch capacitive sensing) the displays may also incorporate force or pressure sensing (e.g. to enable additional press or gesture functions). The touch interface provides an intuitive, quick, and easy user interface and allows for spontaneous and impulsive sharing of media by passengers and drivers.

Additionally, there may be a history function that allows any user to play content that was recently or historically played. For example, swiping or dragging the queue backward, left, or right may bring historical content into view.

In a further embodiment, the processor is configured to receive connection information for the wireless connection, wherein the connection information comprises the connection identifier. The connection information may be received via the wireless connection, a machine-readable optical label, or a near-field communication connection.

In a further embodiment, the processor receives and displays metadata broadcast from the apparatus for each media resource of the queue of media resources. Media resources with metadata may appear in the GUI as a visual representation that for example may comprise text, cover art, motion graphics, dynamic media (e.g. GIF, movie, animation, trailer, etc.), etc. The visual representation of the queue may show the shared digital content may appear in a static or dynamic preview. Additionally, the queue information may be adjustable by the user of the mobile device, the method further comprising sending adjusted queue information to the apparatus via the wireless connection.

According to another aspect of the present disclosure, it is provided that there is a method for providing a queue of media resources received from a mobile device to a vehicle. The method comprises establishing a wireless connection to the mobile device, receiving a URI for a media resource from the mobile device via the wireless connection, and processing the URI to determine information on the media resource, wherein the information on the media resource comprises a media type. The method then comprises selecting a media source comprising the media resource based on the information on the media resource, wherein the media source is associated with the media type, and adding the media resource to the queue of media resources, wherein information on the queue is broadcast via the wireless connection. The method further comprises triggering the media source to provide the media resource to the vehicle, wherein the triggering is based on an arrangement of the queue.

In another aspect, it is provided that there is a method for interacting with a queue of media resources provided to a vehicle. The method comprises receiving a connection identifier related to the vehicle and establishing a wireless connection to an apparatus connected with the vehicle, wherein the wireless connection is known by the connection identifier. The method then comprises receiving a URI for a media resource from a media source and providing the URI to the apparatus via the wireless connection, wherein the apparatus determines the media resource from the URI and adds the media resource to the queue of media resources. The method further comprises receiving information on the queue of media resources broadcast from the apparatus and displaying the information on the queue of media resources to a user.

According to a final aspect, there is a system for managing a queue of media resources. The system comprises a mobile device as previously described or a mobile device configured to perform the previously described method of interacting with a queue of media. The system may further include a vehicle comprising a wireless transceiver, and an audio-visual interface. The processor is configured to provide a connection identifier to the mobile device via the audio-visual interface, wherein the connection identifier is related to the vehicle, and establish a wireless connection with the plurality of mobile devices using the wireless transceiver, wherein the wireless connection is known by the connection identifier. The processor is also configured to receive a URI for a media resource from the mobile device via the wireless connection and process the URI to determine information on the media resource, wherein the information on the media resource comprises a media type. The processor is further configured to select a media source comprising the media resource based on the information on the media resource, wherein the media source is associated with the media type, and add the media resource to the queue of media resources, wherein information on the queue is broadcast via the wireless connection. Furthermore, the processor is configured to trigger the media source to provide the media resource to a cabin of the vehicle via the audio-visual interface, wherein the triggering is based on an arrangement of the queue.

The previously described apparatus for managing a queue of media resources in a vehicle may interface or be controlled by one or more elements of the group of a vehicle operation status component (i.e. the vehicle's onboard computer that provides basic/core vehicle system info like speed, gear selection, lighting, etc.) a navigation or traffic component, an infotainment component, communication component, weather information, safety monitoring component, and an autonomous driving system component. This allows for the system to be integrated with other external systems that can adjust and inform the provision of media resources. For instance, using weather information could allow the system to increase the volume of the media playback due to loud rain or increase the brightness of a video due to cloudiness. Also, using infotainment could allow the media playback to be adjusted to coincide with other sensory effects, such as scent dispensing, heightening a user's perception of a song or video.

BRIEF DESCRIPTION OF THE DRAWINGS

Some examples of apparatuses, methods and/or computer programs will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers, or regions may be exaggerated for clarity. Optional components may be illustrated using broken, dashed, or dotted lines.

Accordingly, while further embodiments are capable of various modifications and alternative forms, some particular embodiments thereof are shown in the figures and will subsequently be described in detail. However, this detailed description does not limit further embodiments to the particular forms described. Further embodiments may cover all modifications, equivalents, and alternatives falling within the scope of the disclosure. Same or like numbers refer to like or similar elements throughout the description of the figures, which may be implemented identically or in modified form when compared to one another while providing for the same or similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations (i.e. only A, only B, as well as A and B) if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular embodiments is not intended to be limiting for further embodiments. Whenever a singular form such as "a," "an" and "the" is used—and using only a single element is neither explicitly nor implicitly defined as being mandatory—further embodiments may also use plural elements to implement the same functionality. Likewise, when a functionality is subsequently described as being implemented using multiple elements, further embodiments may implement the same functionality using a single element or processing entity. It will be further understood that the terms "comprises," "comprising," "includes" and/or "including," when used specify the presence of the stated features, integers, steps, operations, processes, acts, elements, and/or components but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the embodiments belong.

Figure 1:
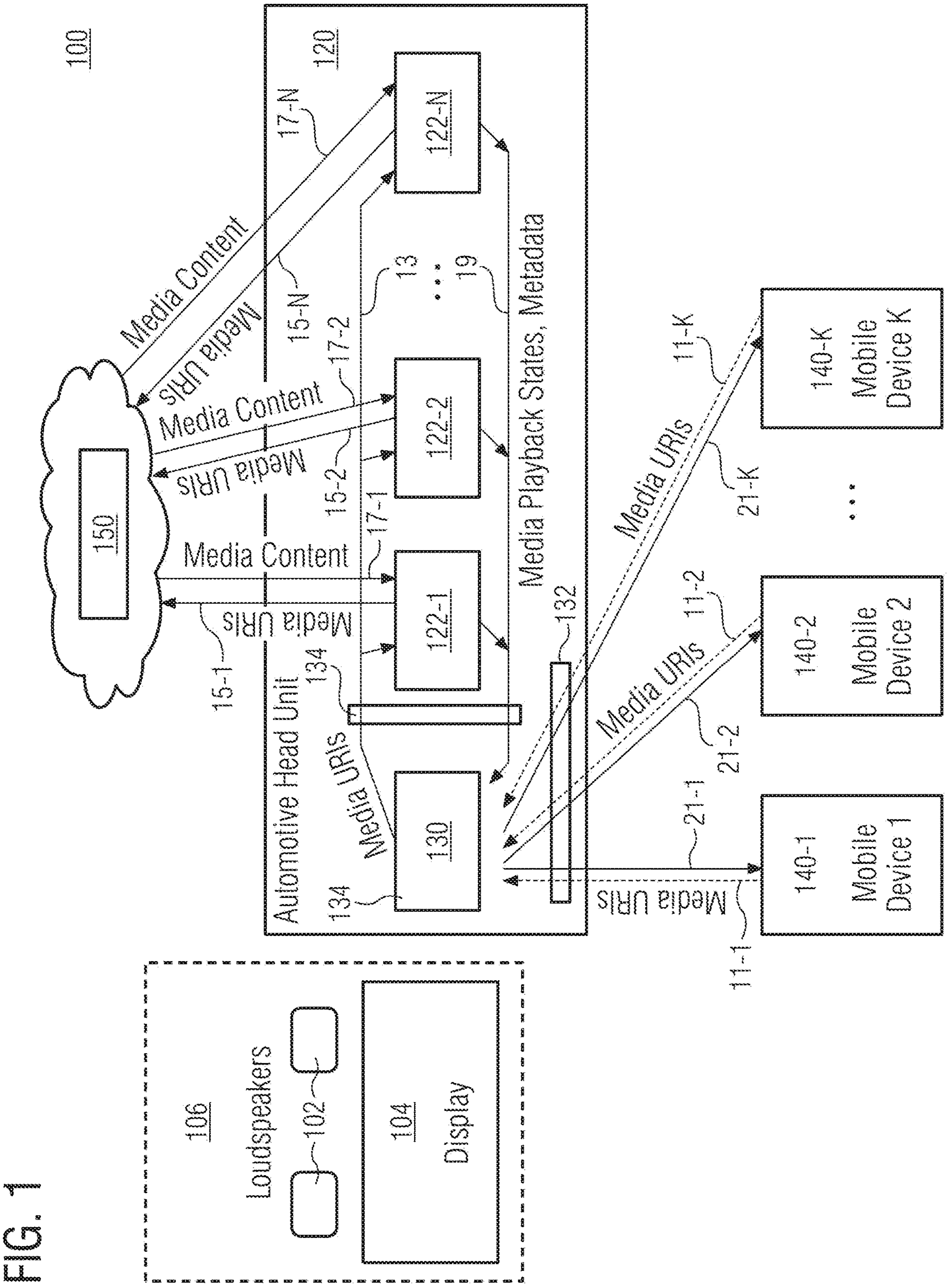
FIG. 1 shows a diagram of an embodiment of a media resource management system.

FIG. 1 shows a diagram of an embodiment of a media resource management system 100. The system comprises an apparatus 12 for providing a queue of media resources received from a mobile device 140-1 or a plurality of mobile devices 140-1 . . . 140-K to a vehicle comprising the system 100. The apparatus 120 comprises a wireless transceiver 134, a vehicle interface 132, and a processor 130. The processor 130 establishes a wireless connection to the mobile device 140-1 using the wireless transceiver 132 and receives a URI 11-1 for a media resource or a media content 17-1, 17-2, . . . 17-N from the mobile device 140-1 via the wireless connection. It then processes the URI 11-1 to determine information on the media resource, wherein the information on the media resource comprises a media type. The processor selects a media source or application 122-1, 122-2, . . . 122-N comprising the media resource based on the information on the media resource, wherein the media source is associated with the media type. The processor 130 then adds the media resource to the queue of media resources, wherein information on the queue is broadcast 21-1. 21-2 . . . 21-K via the wireless connection and triggers the media source to provide the media resource to the vehicle 100 via the vehicle interface 134, wherein the triggering is based on an arrangement of the queue.

Selecting a media source 122-1 . . . 122-N may comprise using the information on the media resource to generate one or more URIs 13 for the media apps. The URI 13 for the media apps may query one or more of a plurality of media apps 122-1 . . . 122-N for the media resource. Media apps 122-1 . . . 122-N may also generate their own URIs 15-1, 15-2, . . . 15-N to query or request the media resource 17-1 . . . 17-N from a data source 150. A data source 150 may be located in the cloud and accessed by an API of the media source. It may also be located in the vehicle or the apparatus. In some embodiments, the data source may be stored on the device of a primary user connected to the vehicle via Bluetooth or another data connection. The processor 130 may further receive metadata 19 for the media resource 17-1 . . . 17-N from the media source 122-1 . . . 122-N Metadata 19 on whether a media app 122-1 . . . 122-N comprises the desired media resource or media content may be returned to the processor 130 to aid in the selection of the appropriate media source and queue management.

Triggering a media source 122-1 . . . 122-N to provide the media resource or media content 17-1 . . . 17-N to the vehicle 100 may also comprise generating a URI 13 for the media app 122-1 . . . 122-N that was selected by the processor 130. The generated URI 13 may then be used to trigger the media app 122-1 . . . 122-N to provide the media resource to the vehicle 100. Providing the resource to the vehicle may be done on any audio, visual, or other sensory apparatuses 106 connected to the vehicle. For example, music content could be played on one or more loudspeakers 102. In an embodiment, the processor 130 may select the media app 122-1 based on what sensory devices or apparatuses 106 are available to the media app.

Additionally, this system 100 may incorporate functionality related to private audio zones, where audio to different users and/or seats can be precisely controlled (e.g. the passengers can hear the music, but the driver cannot, or the passengers hear the music at a particular volume and the driver hears it as a different volume (e.g. lower volume, etc.).

In the case where a vehicle has audio zones, the media app may, for example, be selected based on its access to the audio zone. For example, the DRM of a subscription music app 122-1 . . . 122-N associated with a driver may require that the driver be included in any audio zones where the music is to be played. In another case, the media app may be triggered by the processor to play only on certain loudspeakers 102 in certain audio zones. For example, a mobile device URI 11-1 may indicate that music from a certain mobile device should only be shared in a second-row audio zone. The processor 130 may then trigger a media source or app to play a song only on loudspeakers 102 in the second row.

Triggering a media source may further comprise directing the vehicle to convey the media resource to a user. Conveyance of a media resource can be done with any sensory apparatus present in a vehicle. Sensory apparatuses 106 may include any stimuli apparatuses that produce a visual stimulus, an audio stimulus, a scent stimulus, a temperature stimulus, or a tactile stimulus. Media resources can be delivered by any sensory device(s) or a system(s) in a vehicle cabin, such as a climate control system (e.g. an air conditioner, a heater, etc.), an infotainment system, seating features (e.g. a seat massage, a seat heater, or seat cooler, etc.), lighting, user interfaces, interior surfaces such as shades, interior panels, windows, moon-/sun-roofs, etc. For example, the vehicle seat system (e.g. with features including position, motion, articulation, massage, temperature, airflow, etc.) embedded in a vehicle seat may be controlled by media apps connected to the vehicle. For example, a video app 122-1 . . . 122-N may use a display 104, loudspeakers 103 or other audio systems, seat massagers, and a climate control system (e.g. an air conditioner, a heater, etc.) to show a movie with multiple sensory experiences. In a further example, a movie, if able to be viewed by the driver (e.g. in a vehicle with mid-level autonomous capabilities), the processor 30 may direct the video app to exclude the driver from certain sensory experiences. This may preserve the driver's attention to maintain vehicle safety. Likewise a user of a mobile device 140-1 . . . 140-K may also proactively choose to be excluded from one or more sensory experiences currently or in the future through management of the upcoming queue of media resources (e.g. if the user dislikes the use of the seat massagers during a movie or just does not want a genre of upcoming music to play in their audio zone).

The processor 130 may further provide connection information to the mobile device 140-1 . . . 140-K wherein the connection information comprises a connection identifier uniquely relating to the vehicle 100 and the wireless connection is known by the connection identifier. The connection information may only be briefly shared. For example, shortly after a vehicle is started or if new passengers are detected (e.g. through passive RC monitoring or through other means described in this specification). This ensures that unique information on the vehicle is not broadcast publicly as the vehicle moves through the city. Moreover, if occupancy sensors or systems determine that the vehicle is full, the connection information may no longer be broadcast.

The apparatus may further broadcast 21-1 . . . 21-K metadata 19 over the wireless connection. Broadcasting metadata allows the application on a mobile device 140-1 . . . 140-K to produce visualizations regarding associated media elements in the queue. The processor 130 of the apparatus may further comprise receiving adjusted queue information from the mobile device via the wireless connection and adjusting the queue based on the adjusted queue information. At any time during the connection period of mobile devices 140-1 . . . 140-K, the media resource URI queue order and content can be changed via a user interface connected to the apparatus or daemon app 130.

Figure 2:
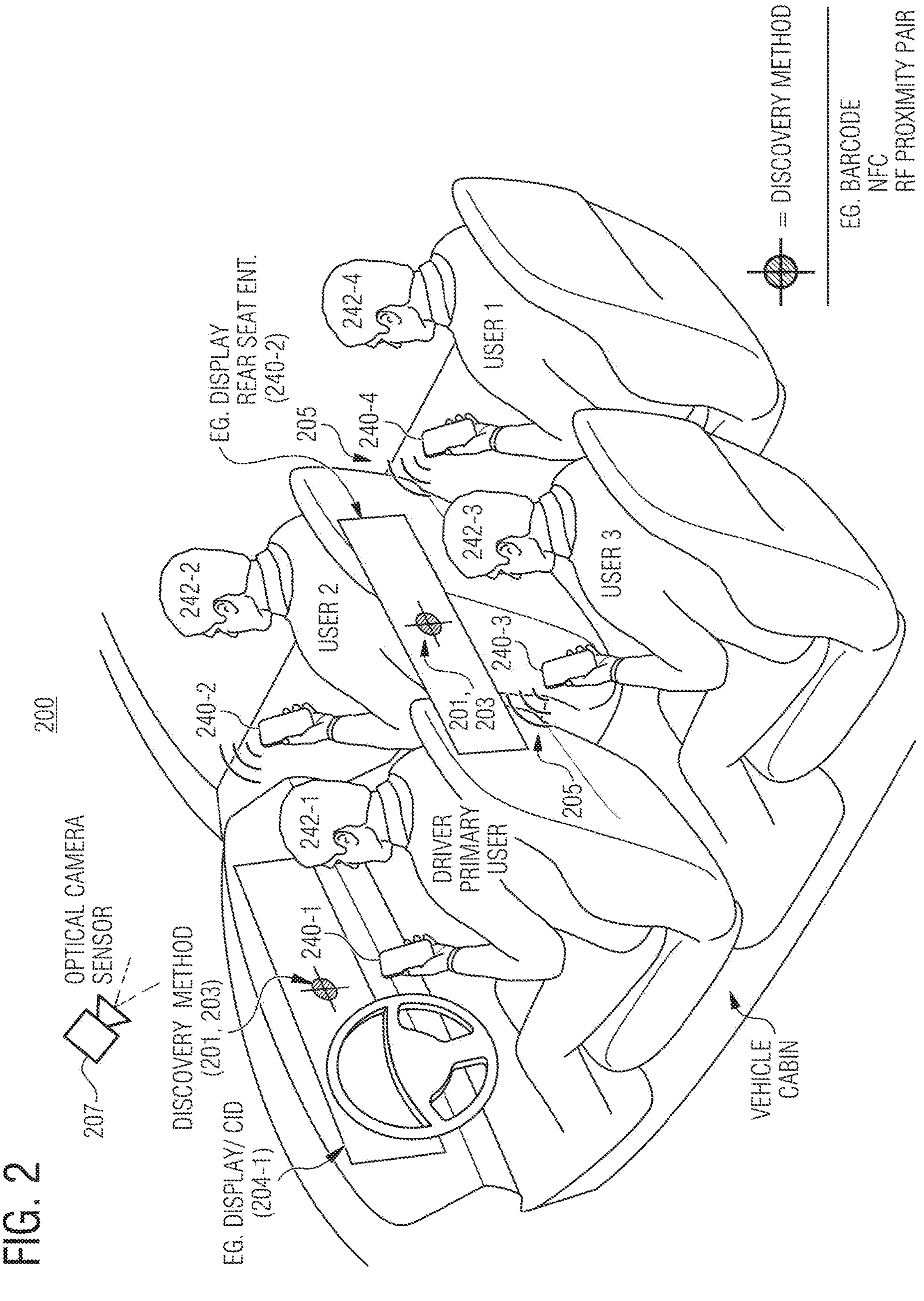
FIG. 2 shows an embodiment of the system in a cabin of the vehicle.

FIG. 2 shows an embodiment of the system in a cabin of the vehicle 200. The vehicle 200 may have several displays including a central information display (CID) 204-1 and a plurality of further displays such as 204-2 for passengers 242-3, 242-4 in the second row or rear seats of the cabin. The connection information for the apparatus may be provided by the wireless connection, a machine-readable optical label, or a near-field communication connection. Each user (e.g. driver and passengers) 242-1, 242-2, 242-3, 242-4 may have a mobile device 240-1, 240-2, 242-3, 242-4. In FIG. 2, the connection information may be presented on the displays as a machine-readable optical label (e.g. a QR code) 201. The connection information may further comprise an application identifier of an application for communicating with the apparatus via the wireless connection.

This information can be presented as part of a discovery process that facilitates the installation or activation of software on the mobile device that can securely and conveniently communicate wirelessly with the apparatus. Optical labels may be captured by an optical sensor on a mobile device. The barcode can be shown on one of the vehicle's displays. Alternatively, the barcode could be a permanent fixture of the vehicle interior (printed on a surface, pressed into leather, etc.). In an alternative embodiment, near-field communication (NFC) can be used. NFC tags may be active or passive, and they may be scanned by a near-field scanner on a mobile device. Tags may be permanent physical fixtures of the vehicle interior. Barcode—as described above, the barcode may be of a standard format such as a linear barcode or matrix barcode (e.g. QR code, App Clip Code, etc.).

Additionally, the optical label may be digitally displayed on any smart device (e.g. smartphone app) or digitally shared (e.g. text message, email, etc.), or shared via an app, which for example would allow a primary user to share/show the code via their smartphone either outside or inside the vehicle, before or during a journey)

NFC tags may be placed in physical locations that are accessible (e.g. front and rear seats) to the user inside or outside the vehicle. The locations may be at any physical surface or material of the vehicle, and/or be combined with digital touchpoints such as touchscreens, "multi-sensory" surfaces/areas (e.g. with visual effects or illumination, haptics, etc.), e.g. crystal elements, LED illumination, digital projection, etc.).

In an embodiment, NFC tags 203 can be embedded in the displays 204-1, 204-2. When embedded in the display a visual icon may be presented to a user at the location of the display where the NFC is embedded, allowing for faster discovery of the tag. Broadcast data 205 can also be used to facilitate the connection. Mobile devices determined to be inside the vehicle via RF proximity pairing technology could be automatically prompted to download/activate appropriate software to communicate with the head unit. Other apparatus may help facilitate the connection. For example, a vehicle cabin 200 may include an interior camera 207 that may be used to detect occupancy. In an embodiment, if the system detects that no passengers are in the rear seats, no QR code or other prompt may be presented on the rear display 204-2.

In an embodiment, the connection information is sent wirelessly using an RF proximity (e.g. UWB communication) method. In this embodiment, the system may determine the proximity and/or location/direction, and/or status of the device and issue a notification to the device, prompting the user to activate (e.g. download, install, open, etc.) the software/app.

Figure 3:
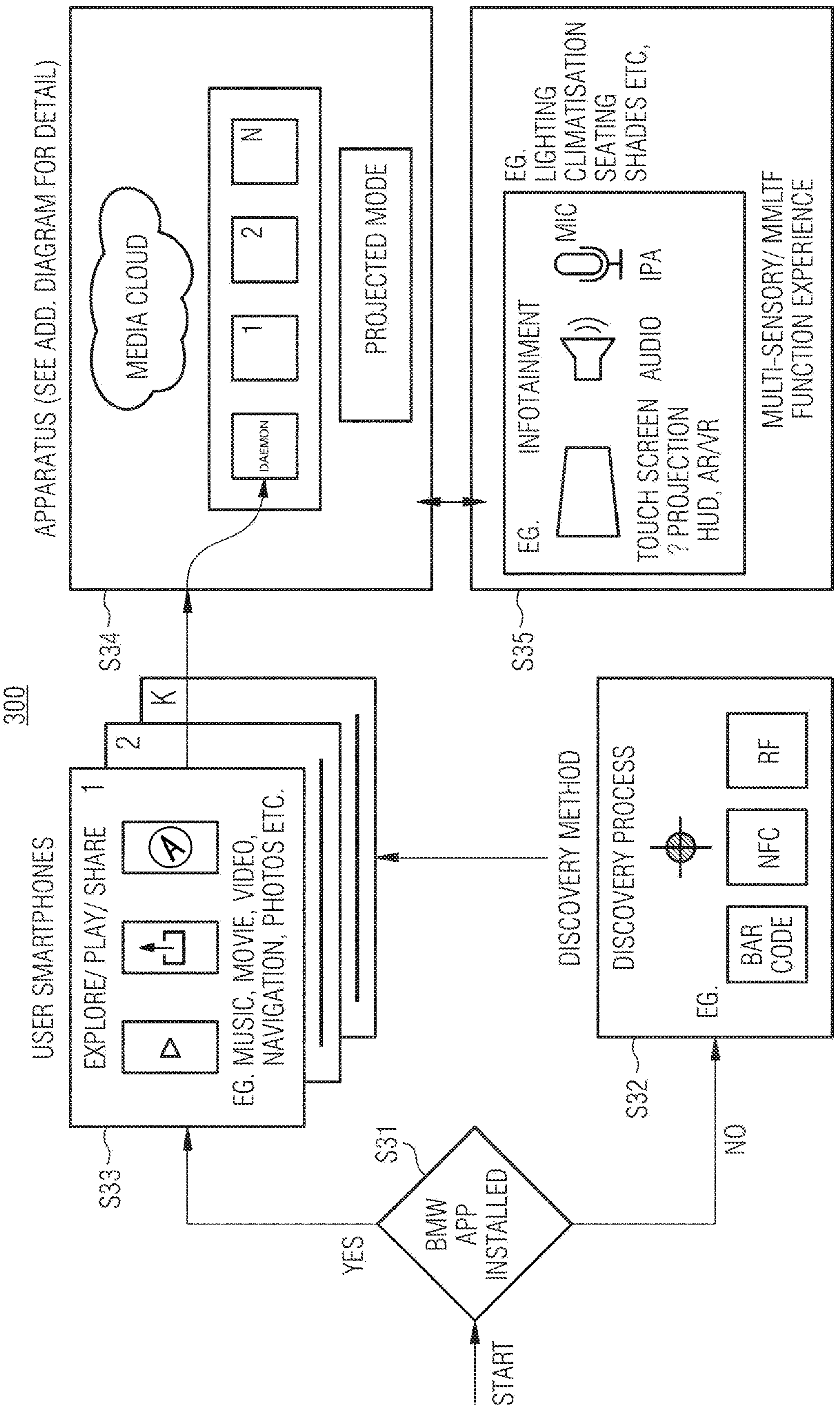
FIG. 3 shows a block diagram of a decision tree for the apparatus and the method.

FIG. 3 shows a diagram of a decision tree 300 for the apparatus and the method. In step S31 the apparatus of the vehicle determines if any mobile devices present in the vehicle can connect to the apparatus via the wireless connection. If yes, the apparatus proceeds to step S33. If not, the apparatus initiates a discover process S32 to provide the connection information and any associated application to the mobile devices. In this discovery process, the mobile device receives connection information for the wireless connection, wherein the connection information comprises the connection identifier. In some embodiments, wherein the connection information is received via, a wireless connection, a machine-readable optical label, or a near-field communication connection.

Once a device is found, the overall process or approach shown in FIG. 2 comprises two sub-processes: the discovery process S2 and user flow S3 . . . S5.

- The discovery process S2 is a simple initial "setup" step (guiding the user to install an app on their smartphone) that the user performs to enable the user's smartphone (or device) to share digital content with the system
- The user flow S3 . . . S5 is the process that one or more users (passengers and/or driver) perform to share content in the vehicle.

In many situations, there is a "primary user" (e.g. driver, most frequent driver, a user that unlocked the vehicle (e.g. with a key fob or smartphone, manually or automatically), etc.) whose smartphone is paired and connected to the vehicle. There may also be multiple (two or more) primary users, dependent on the details of the vehicle systems and other aspects (e.g. communication protocols, etc.).

The vehicle may have software or apps (e.g. OEM or 3rd party) preinstalled or installed at any time. The software or apps would enable shared media content to be played. Additionally, the user profile of the primary user(s) (or potentially any user) and/or vehicle profile would allow access rights to the media (e.g. according to app/service/subscription agreements, as is common with free and paid digital streaming media services; e.g. Spotify, Apple Music, Netflix, YouTube, etc.) and resolve any Digital Rights Management (DRM) issues.

In a vehicle, the head unit discovers 1 to K mobile devices via a discovery method S2. Additionally or alternatively, the 1 to K mobile devices and discover the head unit. After discovery, mobile devices can share media URIs S32 wirelessly with the head unit. These media URIs are ingested by a daemon app on the head unit S33 and placed into a queue. Visualization of this queue can optionally be shown on one of the automobile's displays S35. The media URI at the head of the queue is forwarded to 1 of the N media apps on the system that can appropriately serve the URI's content. An appropriate media app serves the media content, either on one of the automobile's displays, over the automobile's loudspeakers, or both. The media content can be retrieved from various sources (internet, local storage, radio, etc.). During playback, playback state information and media metadata are sent from the media app back to the daemon app for visualization and queue-maintenance purposes. When a piece of media finishes its playback, the media URI queue advances by 1 and the next media URI is forwarded to its appropriate media app for playback (repeating at step S33).

At any time during this process, discovered mobile devices can continue to add to the tail of the media URI queue. Additionally or alternatively, the system may be managed more substantially via one or more smart devices of the occupants or users. Additionally, there may be settings that can change the default sharing behavior, e.g. if shared media is placed at the front of the queue (play next), rear of the queue (play last), or play immediately.

Optionally or alternatively, digital content may be streamed with real-time control, and the user experience or GUI display of the content would adapt accordingly to show the content being streamed in real-time. This feature would allow benefits such as allowing the sharing user (or potentially any user) to control the media (e.g. play, pause, scrub backward/forward, zoom, etc.) as an aspect of the experience. The results would be similar to how mirroring or casting of content can be controlled in real-time.

The key aspect of this invention is to allow any user (e.g. not only a primary user) to seamlessly share media content in the vehicle without affecting the primary user's connection to the vehicle. The discovery methods S2 are an effective solution to quickly and easily guide the user to find and install the correct app on their smart devices.

One or more primary user(s) may be paired and connected to the vehicle. First-time users will be guided by one or more of the discovery methods S2 to install an app on their smartphone (or any compatible smart device). To raise awareness and promote the ability to share media content, the vehicle occupants or users may be informed of the availability of the system and/or discovery method by the vehicle GUI. This may occur at the start of the journey, periodically during the journey, when certain GUI aspects are activated (e.g. entertainment mode/functions), intelligently or contextually (e.g. when the system senses the presence of one or more smartphones (e.g. camera sensing using a camera 207, BLE communication protocol, etc.), via Intelligent Personal Assistant (IPA), when 1 or more passengers are detected (e.g. camera, seat occupancy, etc.), sensing the social context (e.g. conversation between occupants, silence, vehicle and/or user activity, etc.), journey/navigation information, etc.)

Once the app is installed, the app can identify the vehicle and all subsequent journeys are facilitated. Additionally, it may be possible for journeys in other vehicles to be facilitated without having to repeat the discovery process S2 for each new vehicle.

Additionally or optionally, the system may evaluate S1 if the vehicle or primary user has the correct apps installed to support the shared media and may provide notifications and/or automatically install the required software or apps. Additionally, the user may download the app independent of the discovery method (e.g. the user is aware of the app, the primary user recommends the app to the passengers/user, etc.), or the app may have been downloaded as a result of a previous journey.

The IPA of the vehicle or smartphone may play a role in interaction with the system. For example, one or more users can ask how to connect to the system, the IPA may contextually suggest connecting or using the system, users can ask the IPA to manage, control or play media content, IPA may make proactive recommendations (e.g. based on the categorization or characteristics of the music (e.g. emotion, genre, tempo, beat, etc.) similar to a DJ, reordering music, or playing similar or related music/songs, etc.)

After the mobile devices are connected in the previous steps, a user on their smartphone can navigate to any media resources or digital content on their phone (e.g. music, movies, videos, navigation, photos, etc.) and use the sharing functionality of the smartphone to share a URI of the media resource with the apparatus over the wireless connection. In this step S33, the mobile devices may also read information broadcast from the apparatus regarding current queue information and associated metadata. In some embodiments, the apparatus may be able to alter this data, such as by altering an order or composition of a queue of previously shared songs. In other embodiments, the mobile devices may be able to write or send instructions to the apparatus, such as those to play or pause the content currently being delivered by the vehicle. In step S34 the apparatus of the vehicle reads or receives URIs of media resources and any other associated data, such as a reordered queue, and manages that data according to the methods described herein. In step S35 the apparatus triggers the delivery of content by the vehicle according to one or more queues of shared media resources.

A GUI presented by the apparatus may have distinct experience modes or visual treatments according to distinct functions of the system and/or mood of the experience in the vehicle. These experience modes may also control/influence/adapt different sub-systems and functions of the vehicle to create a multi-sensory experience; for example controlling the lighting (e.g. ambient or feature lighting, digital projection, etc.), infotainment system (e.g. video and audio characteristics, etc.), climatization system, seat functions (e.g. seat position, massage, haptics, etc.), windows and shades, etc.

For example, there may be a "party" mode (e.g. songs or music videos are mixed together in a continuous mix, media may be shuffled or replayed according to what's in the queue and history; e.g. this may require a music mixing algorithm to match characteristics such as speed, beat; e.g. may incorporate a change in audio profile (e.g. volume, bass, etc.), change in cabin lighting, seat haptics, climatization, etc.), karaoke mode (e.g. where the lyrics are shown in sync to the song), "battle rap" mode (where a shared song will "bump" (immediately replace) the currently playing song), a "flow" mode (e.g. default "listening" mode) where songs are fluidly played in the order they're shared, etc.

It should be noted that these experience modes, combined with different approaches to how media is shared and managed in the queue may facilitate vastly different social experiences and social behaviors (e.g. social dynamics) between the users/occupants of the vehicle.

Additionally or alternatively, the users (vehicle occupants) may be informed of the availability of the system and/or discovery method. A digital or physical cryptographic code may be displayed in the vehicle. The digital code may be a static graphic or motion graphic (e.g. procedurally generated CG animation) that appears on a display (e.g. touchscreen, digital projection, HUD, etc.) of the vehicle. The digital code may appear as a component/aspect of a GUI. It may appear permanently, periodically, or on request (e.g. as a sub-menu or sub-panel of a GUI). Additionally, it may appear smartly or contextually dependent on whether the system detects the presence of one or more smartphones.

The system may use Bluetooth or BLE communication protocols to determine the presence and/or connectivity status of the smart device (e.g. determining if the device is paired and/or connected, or not) and respond accordingly (e.g. displaying the code or not). Additionally or alternatively, other forms of context sensing may be used, for example, an interior camera 207 with object recognition may determine the presence of a smartphone or device.

Additionally, the system may intelligently provide media recommendations or suggestions based on past history (same journey or past journeys) or recall "recently played" media from past journeys. This may be helpful to reveal or explain the function of the system to users at the start of the journey and/or when no media has yet been shared to the vehicle by the users.

Figure 4:
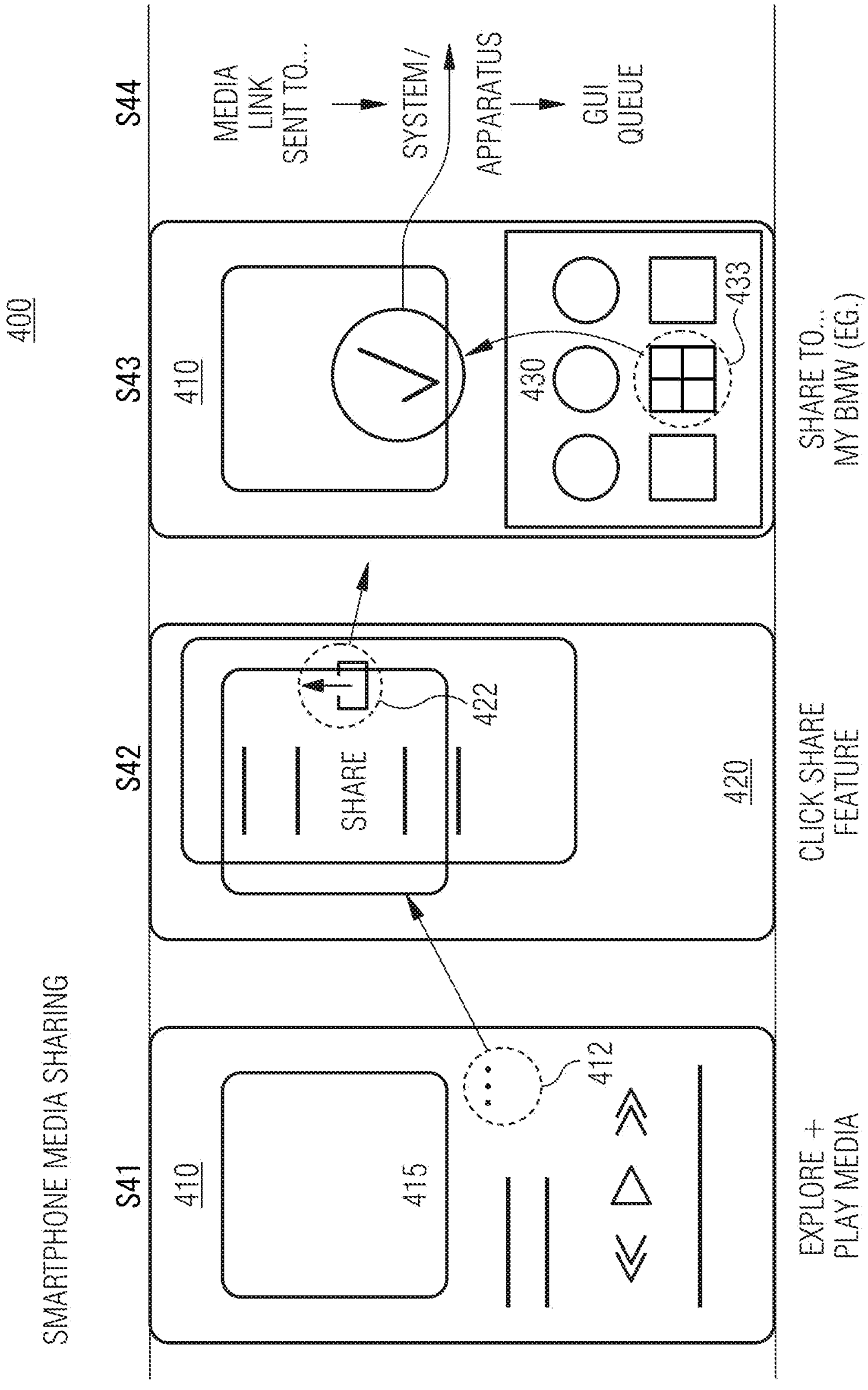
FIG. 4 shows a technical workflow for the sharing a media resource on a mobile device.

FIG. 4 shows a technical workflow 400 for sharing a media resource on a mobile device. A mobile device may comprise a wireless transceiver, a media source interface; and a processor The processor may be configured to establish a wireless connection to an apparatus connected with the vehicle using the wireless transceiver, wherein the wireless connection is known by a connection identifier relating to the vehicle. The processor then receives a URI for a media resource via the media source interface and provides the URI to the apparatus via the wireless connection at which point the apparatus determines the media resource from the URI and adds the media resource to the queue of media resources. The processor may further receive information on the queue of media resources broadcast from the apparatus and display the information on the queue of media resources to a user of the mobile device.

The installation of the smartphone app allows users to "Share to . . . " the app on their smartphone. Apple and Android devices allow sharing content via a "Share" function (or similar feature) to different methods such as text message, email, print, other apps, etc. When installed, the app would appear as an option under the smartphone's "Share" function. This enables smartphone users to use the same process and methods that they currently use to share digital content in the vehicle. The benefit of this approach is that it does not require the user to adapt their device behavior nor learn a different method/process for sharing to the vehicle.

In a workflow 400 of sharing music from a music app 410 of the smartphone, a user may search for or be listing to a song 415 on the app in a first exploration step S41. The user may then share the music through an interface element 412, represented as a button. In some operating systems this immediately presents sharing options 420 as depicted in step S43. However, in some systems, the sharing option or button 422 may be buried in a submenu 420 as depicted in step S42. Once step S43 is reached the connection application 432 can be selected. The application itself can run in the background presenting no further GUI to the user at step S3. At step S45 the URI of the song 415 is sent to the system or apparatus of the vehicle for addition to the queue. The URI may contain additional data such as the application that the media resource was sent from, a plurality of timestamps (e.g. for songs or videos), or any other information that may be processed by an appropriate media source or app on the apparatus of the vehicle.

After the user clicks "Share to . . . " (or any other share button, GUI element, or method) and selects the connection application, the user would see the shared media content appear on the GUI (e.g. CID touchscreen, rear seat display, Panorama HUD, HUD, AR/VR headset, etc.). Typically shared media content would immediately appear in the media queue. If no other content has been shared, the shared media would be at the front of the queue and by default immediately start to play (alternatively/optionally the media may sit in the queue waiting for a user to press play on the GUI. If there is already media in the queue, the shared media will be positioned by the system at the back of the queue. Digital Media appears in the GUI as a visual representation that for example may comprise text, cover art, motion graphics, dynamic media (e.g. GIF, movie, animation, trailer, etc.), etc. E.g. a static or dynamic preview of the shared digital content.

Figure 5:
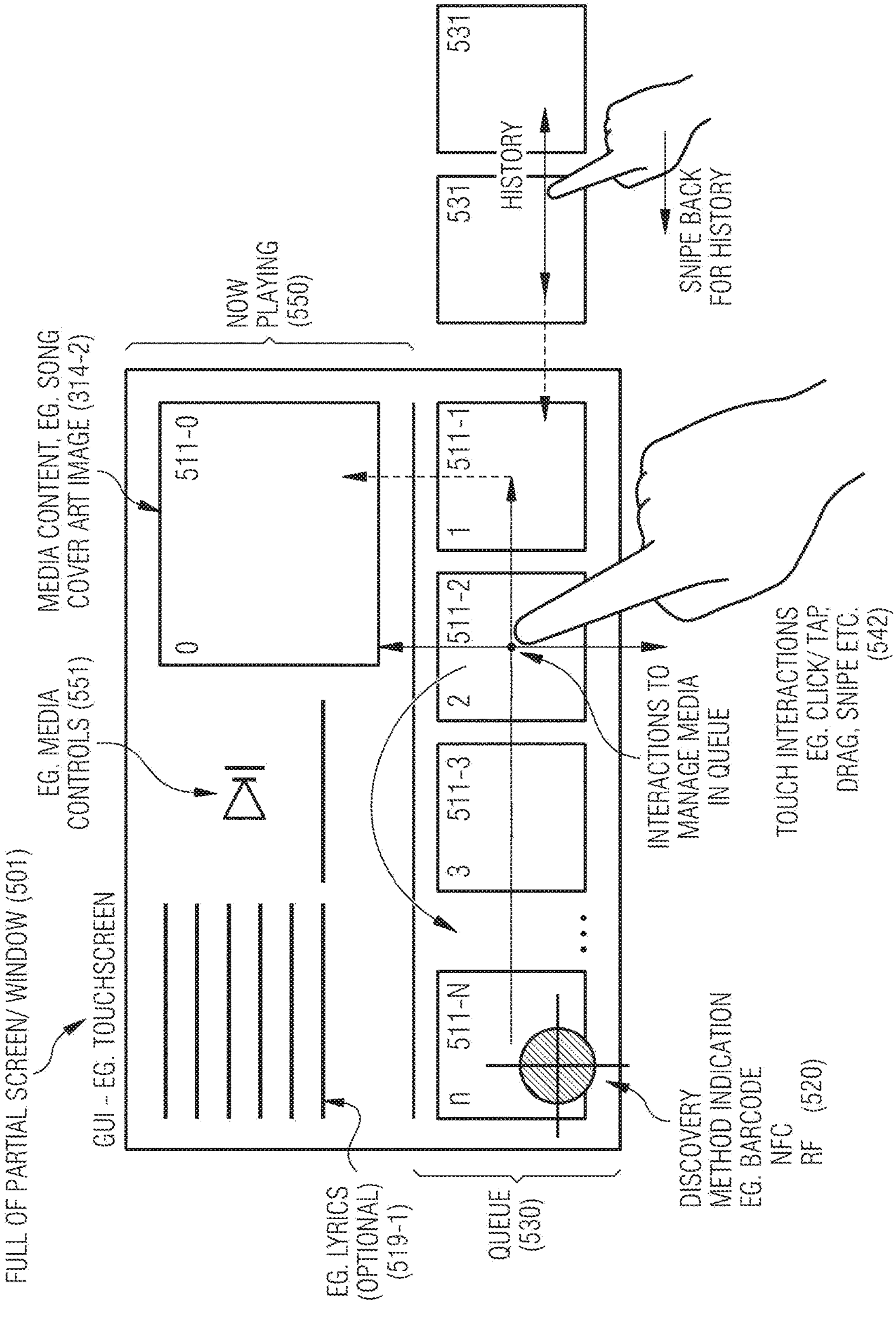
FIG. 5 shows an embodiment of the GUI in a CID of the queue managed by the apparatus.

FIG. 5 shows an embodiment of the GUI 500 for an application that presents a queue 530 of media resources 511-1, 511-2, 511-3, . . . 511-N displayed on a touchscreen 504 associated with the mobile device or the vehicle. The GUI 500 can be presented in a full or partial screen or window 501. The mobile device can receive and display metadata 519-1, 519-2 broadcast from the apparatus for each media resource 511-1 . . . 511-N of the queue of media resources. The apparatus can receive the metadata from the media sources or apps on the vehicle. The queue elements 511-1 . . . 511-N may display album art that is derived from metadata associated with each media resource. FIG. 5 shows a display 504, which is a touch screen. Screen 504 displays a queue 520 that is broadcast from the apparatus as described herein. The queue 520 may be adjusted using any interactions or gestures of a user 542 that are native or otherwise programmable into the mobile device. These include click, tap, drag, and swipe interactions. The user 542 may be able to swipe back for a history of media resources 531 (e.g. songs that were already played). The user 542 may also be able to drag a media resource 511-2 in the queue to rearrange its order. The current media resource being executed by the vehicle 511-0, such as a song being plaid, may be presented on a now-playing screen or window 550. This screen may show metadata 519-1, 519-2 related to the media content or resource that is now playing 511-1, such as album art 519-2, lyrics 519-1, artist information, etc. The interface may also provide media playback controls 551. In the example of audio-visual media resources, these may include play, pause controls, scrubbing a timeline, volume controls, etc.

In an embodiment of the mobile device, may send playback state information to the apparatus of the vehicle via the wireless connection. This allows the user of the mobile device to perform actions such as play, pause, repeat (once or a plurality of times), advance, or go back to a previous media resource of a queue. The apparatus of the vehicle may broadcast via the wireless connection, playback state information on the media resource of the queue of media resources that are provided to the vehicle. The mobile device may receive playback state information on a media resource of the queue of media resources currently provided to the vehicle. The playback state information may be displayed to the user as a timeline of the media resource (e.g. minutes left on a video or audio resource), and the playback information may be adjustable by the user of the mobile device (e.g. by scrubbing or jumping to a specific timestamp in a movie or song). That adjusted playback information can then be sent to the apparatus. The apparatus then receives the adjusted playback state information from the mobile device via the wireless connection and alters or adjusts the provision of the media resource to the vehicle based on the adjusted playback state information.

The GUI may also display discovery information 520 such as a barcode so that other users may be able to use the mobile device to connect to the system when no other options are convenient or available.

The interface 500 may be displayed as a full-screen app window or may be partially displayed. For example as a widget, as a drop-down menu, or as a windowed app. In the embodiment where the queue information is adjusted by the user of the mobile device, the mobile device sends adjusted queue information to the apparatus via the wireless connection.

Figure 6:
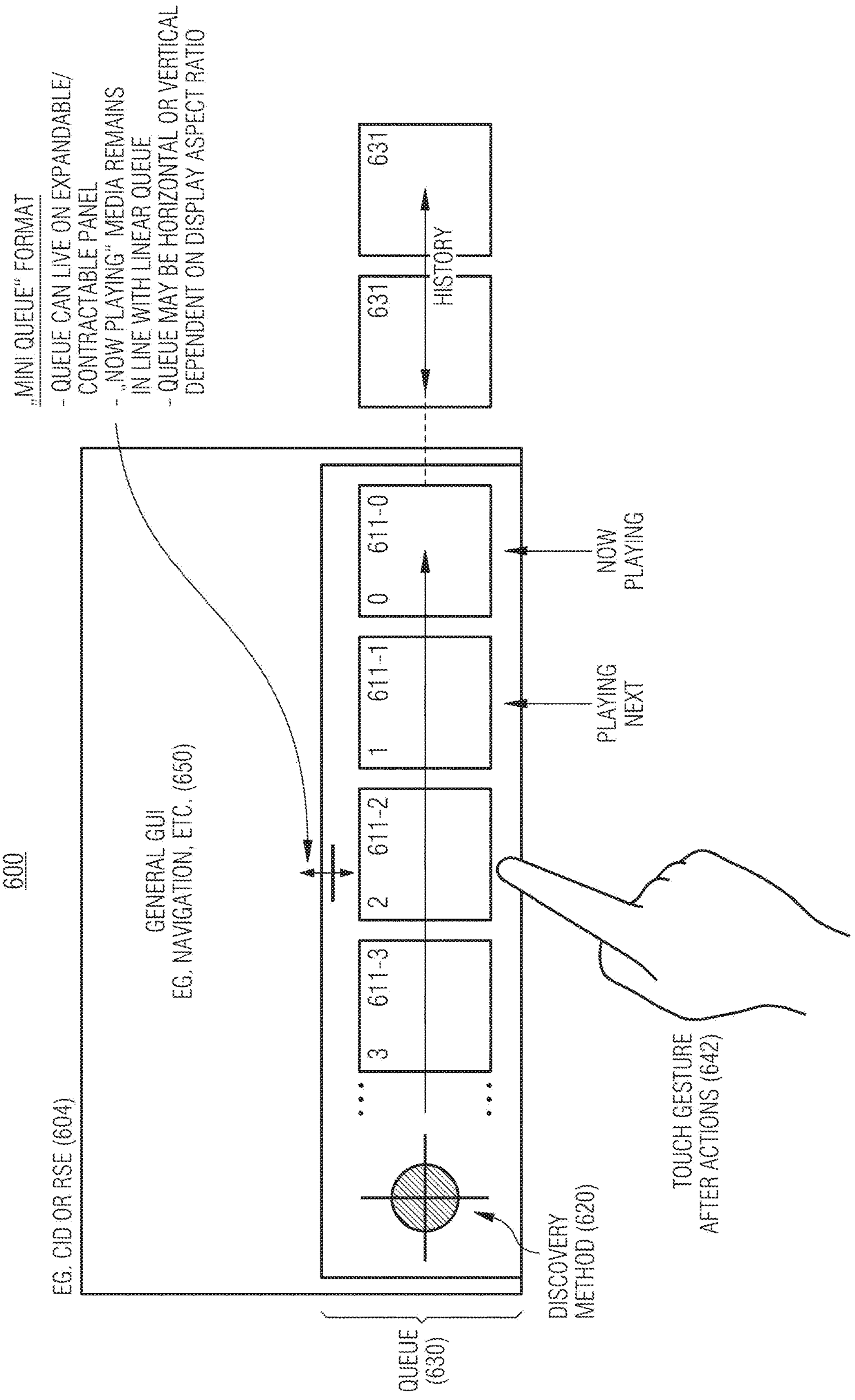
FIG. 6 shows an alternative embodiment of the GUI in a CID of the queue managed by the apparatus.

FIG. 6 shows an alternative embodiment of the GUI 600 in a CID or rear seat entertainment system (RSE) 604 of the queue managed by the apparatus. In this figure, queue 630 is presented in a minimized format so that other information 650 can be presented on the display 604. In some embodiments, the queue can live on an expandable and contractable panel. In the minimized version of the queue 530 of FIG. 5 may remain visible and the media element 511-0 may be returned to the queue and emphasized (e.g. by visually enlarging it) to show its status as currently being delivered by the vehicle. Thus, FIG. 6 shows a queue of resources comprising the now playing element 611-0 and further media resources 611-1, 611-2, 611-3, and 611-4. The queue 630 may also show discovery information 620 such as a barcode so that other users may be able to use the mobile device to connect to the system when no other options are convenient or available. The user 642 may be able to swipe back for a history of media resources 631 (e.g. songs that were already played).

The queue of media resources may be associated with the media type. Associating each of a plurality of media types with a queue may allow for the division of the presentation of resources by media type. For example, the CID may show a navigation app with a plurality of stops added to a route. This may be relevant in a carpool setting where each passenger shares his or her destination with the driver and a queue of locations is provided to a navigation app. Further locations could be added to the queue if new passengers enter the vehicle. The navigation app could then present the queue and an associated route to the driver as is or further sorted (e.g. based on proximate queue locations). Simultaneously, the carpool passengers could add music for the shared journey to the queue. This music could be presented on the GUI as a different queue alongside the navigation queue or app. If the vehicle supports audio zones, a plurality of queues could be created based on which passengers are in which audio zone. For example, a queue for the passenger in the front seat and a separate queue for the second-row passengers. This second music queue may be presented in a GUI of a rear seat display while the first music queue is presented alongside a navigation queue (or any other) on the CID. Further, in this carpool or other examples, the system may determine that a passenger has left the vehicle and alter the queue based on their absences. For example, if passive RF detection of the mobile device associated with a passenger determines that one has left, their shared media resources (present, past, and future) may be removed from the queue. A determination of absence may be done according to various other processes. For example, if a certain time has elapsed since a user interacted with the system they could be prompted to confirm their presence or automatically removed. If the vehicle's GPS coordinates indicate to the system that a destination inputted by the passenger was reached their other media resources may also be removed immediately upon departing the destination or after an elapsed time. Other sensors associated with the vehicle can also impact the decision-making. For example, if a queue of videos is playing for a front seat passenger, that queue may be automatically paused if a door sensor and seat pressure plate detect that the seat is no longer occupied. More advanced location determining systems may also be used.

In an embodiment, the system or apparatus of the vehicle can determine based on several factors the location of the mobile devices and thus the associated user. The system can then use the location of the user in the vehicle when building queues of media resources. For example, as was previously described, building audio or video queues based on the audio zone or nearest visible display in which the user is present. Factors for determining the location of a user may include using devices such as the vehicle's door sensors, seat or airbag pressure plates, seatbelt sensors, or passenger detection using a driver-facing camera 207

Using a fusion of sensors or devices including using passive RF detection (e.g. using one or more BLE beacons) of mobile devices allows for a more accurate location to be determined.

Location determination can also be used as part of the discovery process, a new passenger is determined to be present in the vehicle and passive RF sensing determines that they have a device that is otherwise not connected with the vehicle or presently described apparatus of the vehicle. If that determination is made, various discovery methods, such as the display of a QR code, could be automatically shown on the displays of the vehicle. Moreover, the QR code or any other connection information may be indicated or targeted solely to the new passenger based on their determined location, such as by presenting it on their nearest display. Restricting connection information to just the potential user may avoid distracting the driver.

Figure 7:
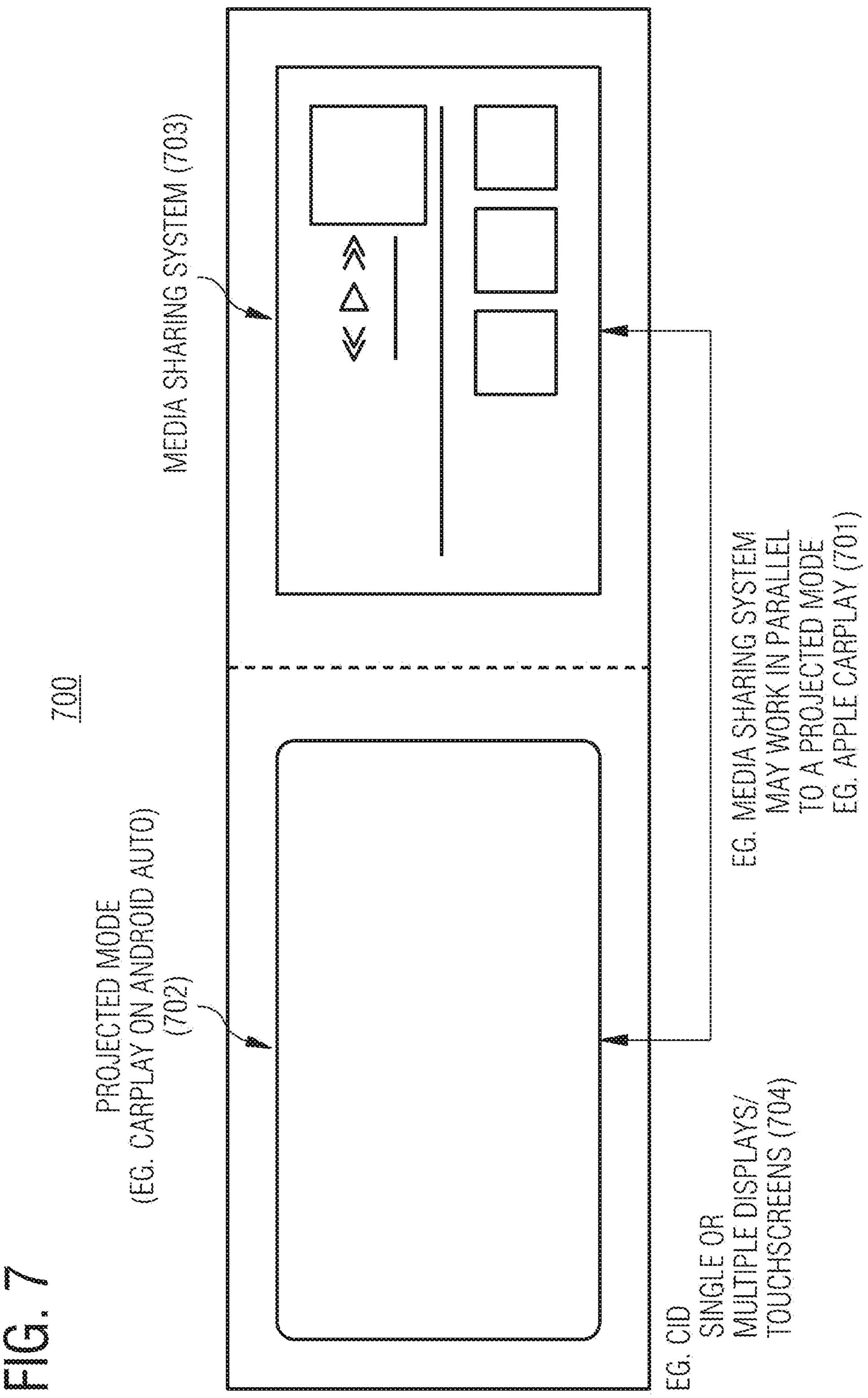
FIG. 7 shows an alternative embodiment of the GUI in a CID of the queue managed by the apparatus.

FIG. 7 shows an alternative embodiment 700 of the GUI 701 in a CID 704 of the queue managed by the apparatus. In this embodiment, the CID 704 can be composed of a single or a plurality of touchscreens, which together show the entire GUI 701. In this embodiment, a portion of the GUI 701 may display the projected mode of a driver's smartphone 702. Another portion of the GUI 702 may display the media sharing system 703 described herein. In this example the media sharing system 703 works in parallel to a projected mode 702 on the GUI 701.

Additionally or optionally the system (e.g. daemon app) may evaluate if the driver is connected directly to the head unit (e.g. native Bluetooth connection to the vehicle infotainment system) or connected via Projected Mode (Apple CarPlay or Android Auto). The system may then direct the media instructions (e.g. URI) to the correct system components—without concerning the user. The important aspect is that the user does not need to be aware of how the primary user is connected to the vehicle and which mode is being used. The GUI of the system may operate in parallel, alongside, or alternately (e.g. the user can switch between GUIs) with the projected mode.

One or more users may manage or control the shared content that appears in the queue by one or more interaction devices (e.g. front CID, rear seat display(s), digital projection, smartphone, or smart-device app, etc.). For example, single or multi-touch interactions/gestures such as click and swipe may be used to play/pause, skip, or reorder content by dragging/dropping content (e.g. song, movie clip, photo, playlist, etc.) from one position to another in the queue, removing content from the queue by dragging content off the queue, playing content by dragging the content into the "now playing" panel/field, etc. There may be multiple interaction modalities to achieve the same use-interaction input, for example clicking, dragging, swiping, long-press context or sub-menu, or an "options" icon or menu to open up additional/relative GUI panels. In addition to touch sensing (e.g. multi-touch capacitive sensing) the displays may also incorporate force or pressure sensing (e.g. to enable additional press or gesture functions). The touch interface provides an intuitive, quick, and easy user interface and allows for spontaneous and impulsive sharing of media by passengers and drivers.

Additionally, there may be a history function that allows any user to play content that was recently or historically played. For example, swiping or dragging the queue backward, left, or right may bring historical content into view.

When the shared content is actively playing, the content (e.g. song or movie) may play in a "now playing" field, and the visual representation of the content may include relevant information or visual interest, such as lyrics, subtitles, language options, dynamic visuals (e.g. graphics, animations, motion graphics, etc.), music videos, etc.

The GUI may have distinct experience modes or visual treatments according to distinct functions of the system and/or mood of the experience in the vehicle. These experience modes may also control/influence/adapt different subsystems and functions of the vehicle to create a multisensory experience; for example controlling the lighting (e.g. ambient or feature lighting, digital projection, etc.), infotainment system (e.g. video and audio characteristics, etc.), climatization system, seat functions (e.g. seat position, massage, haptics, etc.), windows and shades, etc.

Additionally, camera sensing may be integrated to determine aspects such as seat occupancy, user presence and identity (e.g. user, face recognition), user behavior and actions (e.g. physical response to music (e.g. rhythmic motion, e.g. head bobbing, finger tapping, dancing, etc.), smartphone and device presence (e.g. object recognition) to intelligently inform the system (e.g. promoting a discovery method, highlighting the system functionality on the CID GUI, etc.)

Figure 8:
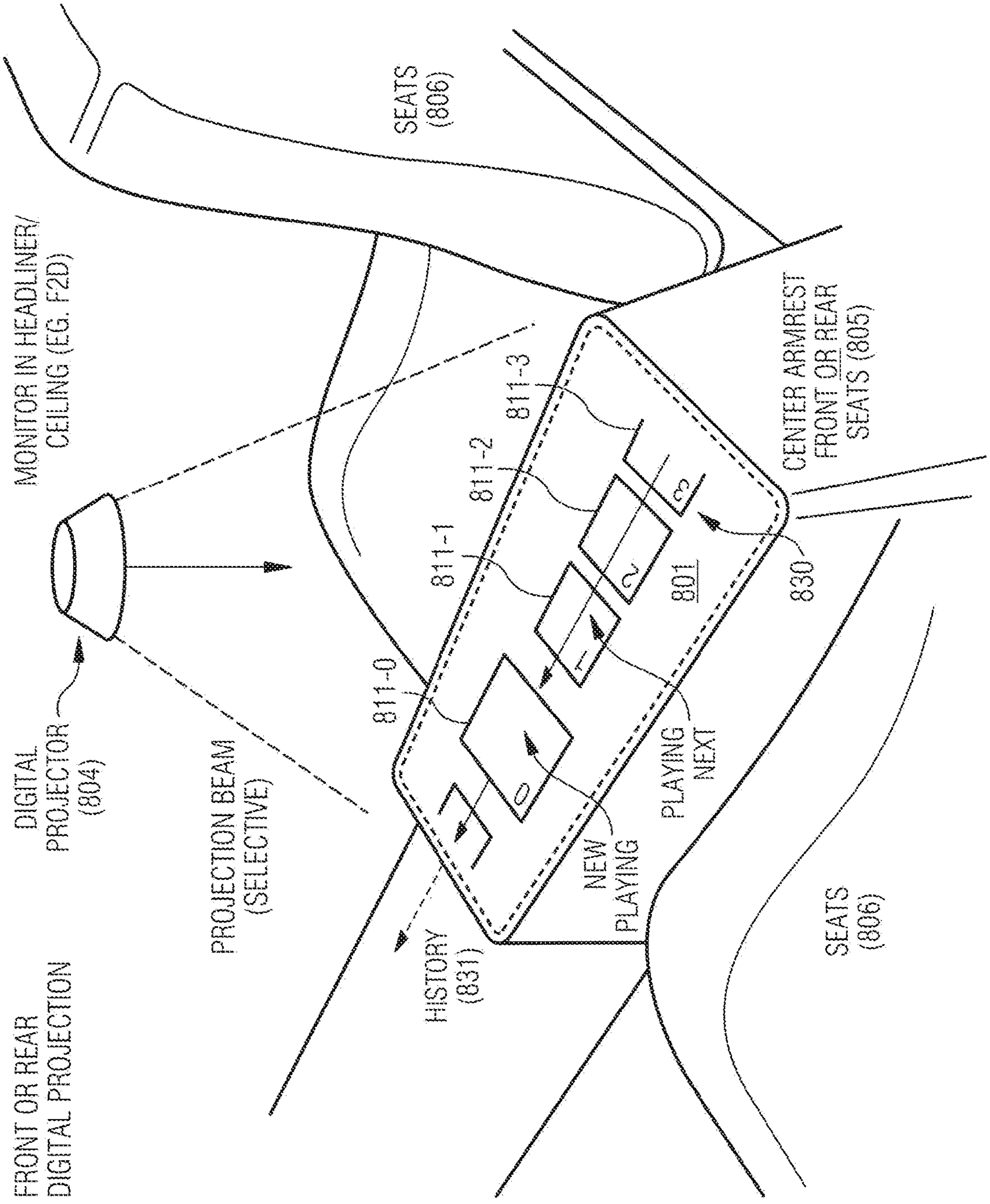
FIG. 8 shows an alternative embodiment of the GUI of the queue managed by the apparatus as presented by an overhead projector.

FIG. 8 shows an alternative embodiment 800 of the GUI 801 of the queue 830 managed by the apparatus as presented by an overhead projector 804. The GUI 801 is projected on a center armrest 805 between seats 806 of the vehicle. These may be front or rear seats. Similar to the minimized queue 630 of FIG. 6, FIG. 8 shows a queue of resources 830 comprising the now playing element 811-0 and further media resources 811-1, 811-2, and 811-3. The now playing media resource 811-0 may be emphasized (e.g. by visually enlarging it) to show its status as currently being delivered by the vehicle. The media resources can be visualized based on their associated metadata, which in FIG. 8 may be album artwork. The queue 830 may also show discovery information such as a barcode so that other users may be able to use the mobile device to connect to the system when no other options are convenient or available. The user may be able to swipe back for a history of media resources 831 (e.g. songs that were already played) if finger tracking cameras or other means of manipulating the GUI are also included.

Figure 9:
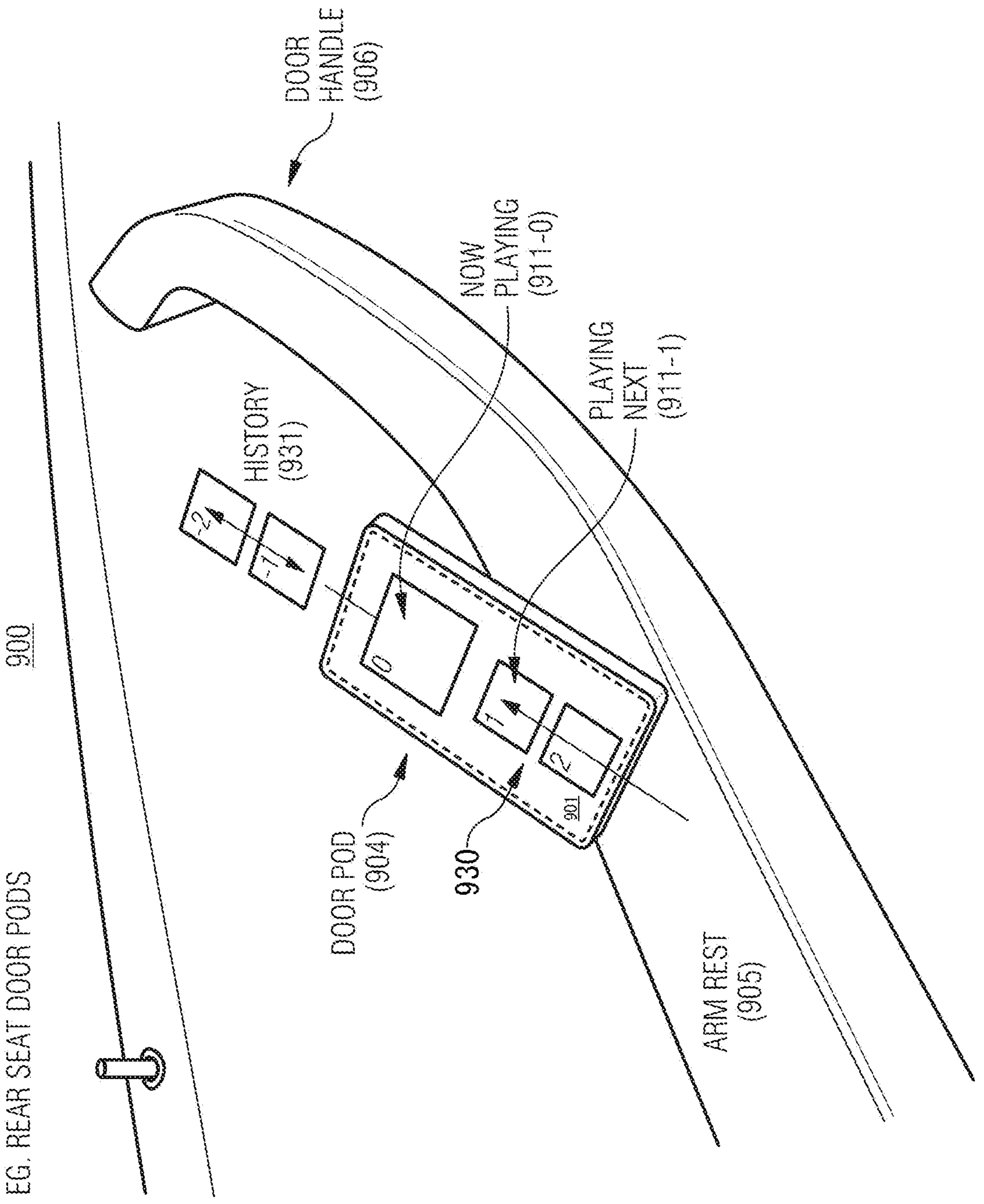
FIG. 9 shows an alternative embodiment of the GUI of the queue managed by the apparatus and presented by a display in a rear door panel.

FIG. 9 shows an alternative embodiment 900 of the GUI 901 of the queue managed by the apparatus and presented by a display 904 in a rear door panel. In this embodiment 900, the display 904 is located between the door handle 906 and an armrest 905. The display may be a touch screen and angled at a degree that facilitates easy viewing by a user in an adjoining seat. Similar to the minimized queues of FIGS. 6 and 8, FIG. 9 shows a queue of resources 930 comprising the now playing element 911-0 and at least one further media resource 911-1. The now playing media resource 911-0 may be emphasized (e.g. by visually enlarging it) to show its status as currently being delivered by the vehicle. The media resources can be visualized based on their associated metadata, which in FIG. 8 may be album artwork. The queue 930 may also show discovery information such as a barcode so that other users may be able to use the mobile device to connect to the system when no other options are convenient or available. The user may be able to swipe back for a history of media resources 931 (e.g. songs that were already played).

Figure 10:
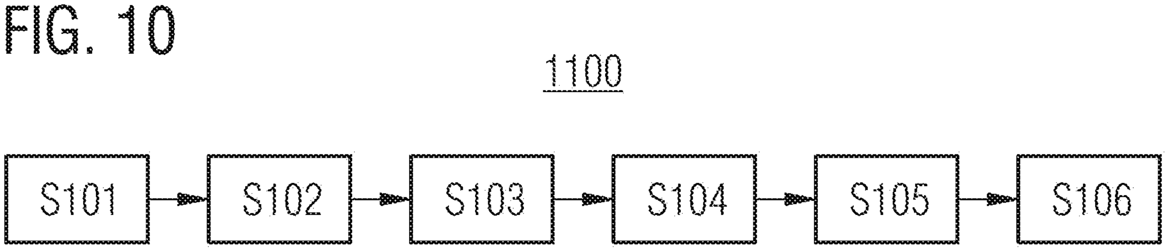
FIG. 10 shows a block diagram of the method for the apparatus of the vehicle.

FIG. 10 shows a block diagram of the method 1000 for the apparatus of the vehicle. The method comprises establishing a wireless connection to the mobile device S101, receiving a URI for a media resource from the mobile device via the wireless connection S102, and processing the URI to determine information on the media resource S103, wherein the information on the media resource comprises a media type. The method then comprises selecting S104 a media source comprising the media resource based on the information on the media resource, wherein the media source is associated with the media type, and adding S105 the media resource to the queue of media resources, wherein information on the queue is broadcast via the wireless connection. The method further comprises triggering S106 the media source to provide the media resource to the vehicle, wherein the triggering is based on an arrangement of the queue.

Figure 11:
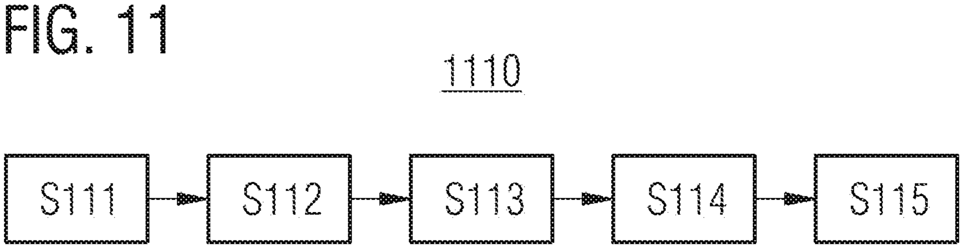
FIG. 11 shows a block diagram of the method for the mobile device.

FIG. 11 shows a block diagram of the method 1110 for the mobile device. The method comprises receiving a connection identifier related to the vehicle S111, establishing a wireless connection to an apparatus connected with the vehicle S112, wherein the wireless connection is known by the connection identifier, and receiving a URI for a media resource from a media source, and providing the URI to the apparatus via the wireless connection S113, wherein the apparatus determines the media resource from the URI and adds the media resource to the queue of media resources. The method further comprises receiving information on the queue of media resources broadcast from the apparatus S114 and displaying the information on the queue of media resources to a user S115.

The embodiments described herein may also form a system for managing a queue of media resources. The system comprises a mobile device configured to perform the method described herein and a vehicle comprising a wireless transceiver, an audio-visual interface, and a processor. The processor may be configured to provide a connection identifier to the mobile device via the audio-visual interface, wherein the connection identifier is uniquely related to the vehicle. The processor then establishes a wireless connection with the plurality of mobile devices using the wireless transceiver, wherein the wireless connection is known by the connection identifier and receives a URI for a media resource from the mobile device via the wireless connection. Once received, the processor processes the URI to determine information on the media resource, wherein the information on the media resource comprises a media type, and selects a media source comprising the media resource based on the information on the media resource, wherein the media source is associated with the media type. Then the processor may add the media resource to the queue of media resources, wherein information on the queue is broadcast via the wireless connection and trigger the media source to provide the media resource to a cabin of the vehicle via the audio-visual interface, wherein the triggering is based on an arrangement of the queue.

In an embodiment, an apparatus or system may be implemented through the use of a generic attribute (GATT) server. A GATT server is used with the Bluetooth Low Energy (BLE) protocol to define the way that two BLE devices (the vehicle apparatus and a mobile device) transfer data back and forth. Once a mobile device knows the connection information for the apparatus it can read and write to dedicated fields of the GATT server. The server listens for or otherwise detects changes to its fields by each mobile device that is connected to the vehicle apparatus and may manage a queue of media resources based on those changes. For example, a mobile device may write a URI for a song to a dedicated song field of the GATT server. The write and the ID of the writing mobile device are detected. The vehicle apparatus then uses any of the methods described herein to determine the song, select a media source to play it, and then add the song to a music queue. Information on the queue may be added to another field of the GATT server and broadcast to all connected mobile devices. One or more mobile devices may then write altered queue information to the server and the vehicle apparatus may then use the altered queue information to change the order of songs in the queue.

Additionally, this system may have features that relate to various levels of autonomous driving (e.g. AD levels 2-4). For example, adapting aspects of the system, adapting system input/output, adapting the control parameters for the system, etc.; e.g. driver input (e.g. via smartphone or CID) and/or aspects of the visual display (e.g. lyrics, music videos, movies, etc.) may be limited at certain moments in the drive according to the road, traffic and driving conditions and driver attention requirements (e.g. according to ADAS level requirements).

In some embodiments, the system may be coupled to a control module. The control module may be implemented using one or more processing units, one or more processing devices, or any means for processing, such as a processor, a computer, or a programmable hardware component being operable with accordingly adapted software. Similarly, the described functions of the control module may as well be implemented in software, which is then executed on one or more programmable hardware components. Such hardware components may comprise a general-purpose processor, a Digital Signal Processor (DSP), a microcontroller, etc. In an embodiment, the system may comprise a memory and at least one processor operably coupled to the memory and configured to perform the above-mentioned method.

Any of the proposed methods may be implemented on a computer. The method may be stored as instructions for a computer or other apparatus on a non-transitory, computer-readable medium. When the medium is read by a computer, the method may be performed or executed by the computer, or any apparatus networked with the computer. A computer-implemented method may provide a reinforcement-learning-based algorithm to autonomously learn user behavior under a different context. The method may not need supervised annotation data and can efficiently and automatically learn on a small set of data adaptively. It may be getting more useful when dealing with a sequence of decisions and actions that may be a common usage scenario but distract the user's attention.

The aspects and features mentioned and described together with one or more of the previously detailed embodiments and figures, may as well be combined with one or more of the other embodiments to replace a like feature of the other embodiment or to additionally introduce the feature to the other embodiment.

Embodiments may further be or relate to a (computer) program including a program code to execute one or more of the above methods when the program is executed on a computer, processor, or another programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable, or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above. A processor may include control circuitry, arithmetic, logic circuitry, and one or more registers. An FPGA may include logic gate circuitry, a plurality of configurable interconnections, and storage security. Instructions for the processor may be included in the apparatus and the processor may execute the instructions.

It is further understood that the disclosure of several steps, processes, operations, or functions disclosed in the description or claims shall not be construed to imply that these operations are necessarily dependent on the order described unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes, or -operations.

If some aspects have been described in relation to a device or system, these aspects should also be understood as a description of the corresponding method. For example, a block, device, or functional aspect of the device or system may correspond to a feature, such as a method step, of the corresponding method. Accordingly, aspects described in relation to a method shall also be understood as a description of a corresponding block, a corresponding element, a property, or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed unless it is stated in the individual case that a particular combination is not intended. Furthermore, features of a claim should also be included for any other independent claim, even if that claim is not explicitly defined as dependent on that other independent claim.

What is claimed is:

1. An apparatus for providing a queue of media resources received from a mobile device to a vehicle, the apparatus comprising:

a wireless transceiver;

a vehicle interface; and a processor, wherein the processor:

establishes a wireless connection to the mobile device using the wireless transceiver, receives a uniform resource identifier (URI) for a media resource from the mobile device via the wireless connection, processes the URI to determine information on the media resource, wherein the information on the media resource comprises a type of media, selects a media source comprising the media resource based on the information on the media resource, wherein the media source is associated with the type of media, adds the media resource to the queue of media resources, wherein information on the queue is broadcast via the wireless connection, and triggers the media source to provide the media resource to the vehicle via the vehicle interface, wherein the triggering is based on an arrangement of the queue.

2. The apparatus of claim 1, wherein the processor first provides connection information to the mobile device wherein the connection information comprises a connection identifier relating to the vehicle and the wireless connection is known by the connection identifier.

3. The apparatus of claim 2, wherein the connection information is provided via:

the wireless connection, a machine-readable optical label, and/or a near field communication connection.

4. The apparatus of claim 2, wherein the connection information further comprises an application identifier of an application for communicating with the apparatus via the wireless connection.

5. The apparatus of claim 1, wherein the processor further receives metadata for the media resource from the media source, wherein the metadata is broadcast over the wireless connection.

6. The apparatus of claim 1, wherein the queue of media resources is associated with the type of media.

7. The apparatus of claim 1, wherein the processor further receives adjusted queue information from the mobile device via the wireless connection and adjusting the queue based on the adjusted queue information.

8. The apparatus of claim 1, wherein the processor further:

broadcasts, via the wireless connection, playback state information on the media resource of the queue of media resources that provided to the vehicle, and receives adjusted playback state information from the mobile device via the wireless connection and adjusting the provision of the media resource to the vehicle based on the adjusted playback state information.

9. The apparatus of claim 1, wherein the mobile device is one of a plurality of mobile devices.

10. The apparatus of claim 1, wherein the vehicle conveys the media resource to a user.

11. A mobile device for interacting with a queue of media resources provided to a vehicle, the mobile device comprising:

a wireless transceiver;

a media source interface; and a processor, wherein the processor:

establishes a wireless connection to an apparatus connected with the vehicle using the wireless transceiver, wherein the wireless connection is known by a connection identifier relating to the vehicle;

receives a URI for a media resource via the media source interface;

provides the URI to the apparatus via the wireless connection, wherein the apparatus determines the media resource from the URI and adds the media resource to the queue of media resources, receives information on the queue of media resources broadcast from the apparatus, and displays the information on the queue of media resources to a user of the mobile device.

12. The mobile device of claim 11, wherein the processor first receives connection information for the wireless connection, wherein the connection information comprises the connection identifier.

13. The mobile device of claim 12, wherein the connection information is received via:

the wireless connection, a machine-readable optical label, and/or a near field communication connection.

14. The mobile device of claim 11, wherein the processor further:

receives metadata broadcast from the apparatus for each media resource of the queue of media resources, processes the received metadata and displaying the processed metadata to a user of the mobile device.

15. The mobile device of claim 11, wherein the queue information is adjustable by the user of the mobile device, wherein the processor further sends adjusted queue information to the apparatus via the wireless connection.

16. The mobile device of claim 11, wherein the processor further:

receives playback state information on a media resource of the queue of media resources currently provided to the vehicle, wherein the playback state information is adjustable by the user of the mobile device, and sends adjusted playback state information to the apparatus via the wireless connection.

17. A method for providing a queue of media resources received from a mobile device to a vehicle, the method comprising:

establishing a wireless connection to the mobile device, receiving a URI for a media resource from the mobile device via the wireless connection, processing the URI to determine information on the media resource, wherein the information on the media resource comprises a type of media, selecting a media source comprising the media resource based on the information on the media resource, wherein the media source is associated with the type of media, adding the media resource to the queue of media resources, wherein information on the queue is broadcast via the wireless connection, and triggering the media source to provide the media resource to the vehicle, wherein the triggering is based on an arrangement of the queue.

18. A method for interacting with a queue of media resources provided to a vehicle, the method comprising:

receiving a connection identifier related to the vehicle, establishing a wireless connection to an apparatus connected with the vehicle, wherein the wireless connection is known by the connection identifier;

receiving a URI for a media resource from a media source;

providing the URI to the apparatus via the wireless connection, wherein the apparatus determines the media resource from the URI and adds the media resource to the queue of media resources, receiving information on the queue of media resources broadcast from the apparatus, and displaying the information on the queue of media resources to a user.

19. A system for managing a queue of media resources, the system comprising:

a mobile device configured to perform the method of claim 17; and a vehicle comprising a wireless transceiver, an audio-visual interface, and a processor, wherein the processor is configured to:

provide a connection identifier to the mobile device via the audio-visual interface, wherein the connection identifier is related to the vehicle, establish a wireless connection with the mobile device using the wireless transceiver, wherein the wireless connection is known by the connection identifier, receive a URI for a media resource from the mobile device via the wireless connection, process the URI to determine information on the media resource, wherein the information on the media resource comprises a type of media, select a media source comprising the media resource based on the information on the media resource, wherein the media source is associated with the type of media, add the media resource to the queue of media resources, wherein information on the queue is broadcast via the wireless connection, and trigger the media source to provide the media resource to a cabin of the vehicle via the audio-visual interface, wherein the triggering is based on an arrangement of the queue.

* * * * *